United States Patent
Konishi et al.

(10) Patent No.: US 9,366,820 B2
(45) Date of Patent: Jun. 14, 2016

(54) COHERENT MIXER AND 2×2 MULTI-MODE INTERFERENCE COUPLER

(71) Applicant: SUMITOMO ELECTRIC INDUSTRIES, LTD., Osaka (JP)

(72) Inventors: Naoko Konishi, Yokohama (JP); Yutaka Onishi, Yamato (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 120 days.

(21) Appl. No.: 14/267,534

(22) Filed: May 1, 2014

(65) Prior Publication Data
US 2014/0334775 A1 Nov. 13, 2014

(30) Foreign Application Priority Data
May 7, 2013 (JP) ................................. 2013-097746

(51) Int. Cl.
*G02B 6/28* (2006.01)
*H04B 10/00* (2013.01)

(52) U.S. Cl.
CPC ................ *G02B 6/2813* (2013.01); *G02B 6/28* (2013.01); *H04B 10/00* (2013.01)

(58) Field of Classification Search
CPC ..................................................... G02B 6/2813
See application file for complete search history.

(56) References Cited

U.S. PATENT DOCUMENTS

| | | | | |
|---|---|---|---|---|
| 5,428,698 A * | 6/1995 | Jenkins | ................ | G02B 6/2813 385/125 |
| 5,475,776 A * | 12/1995 | Jenkins | ................ | G02B 6/2813 385/146 |
| 6,353,694 B1 * | 3/2002 | Paiam | ................ | G02B 6/125 385/129 |
| 6,571,031 B1 * | 5/2003 | Augustsson | ................ | G02B 6/12011 385/24 |
| 7,072,542 B2 * | 7/2006 | Jenkins | ................ | G02B 6/2813 385/130 |
| 7,324,722 B2 * | 1/2008 | Jenkins | ................ | G02B 6/2813 385/28 |
| 8,280,256 B2 * | 10/2012 | Jeong | ................ | G02B 6/12004 385/15 |
| 8,649,643 B2 * | 2/2014 | Jeong | ................ | G02B 6/12 385/39 |
| 8,885,989 B2 * | 11/2014 | Jeong | ................ | G02B 6/12004 385/1 |
| 9,164,237 B2 * | 10/2015 | Onishi | ................ | G02B 6/262 |

FOREIGN PATENT DOCUMENTS

FR  EP 2730958 A1 *  5/2014 ............. H04B 10/61

OTHER PUBLICATIONS

R. Kunkel et al., "First Monolithic InP-Based 90°-Hybrid OEIC Comprising Balanced Detectors for 100GE Coherent Frontends", TuB2.2, IEEE, 2009.

* cited by examiner

*Primary Examiner* — Daniel Petkovsek
(74) *Attorney, Agent, or Firm* — Smith, Gambrell & Russell, LLP.

(57) ABSTRACT

A coherent mixer includes a multi-mode waveguide that has a side surface and an end; a waveguide group including a plurality of semiconductor regions connected to the end; a first semiconductor region that has a side surface extending substantially parallel to the side surface of the multi-mode waveguide; and an external semiconductor region having a side surface extending substantially parallel to an edge of the waveguide group. The side surface of the semiconductor region is spaced apart from the side surface of the multi-mode waveguide by a distance smaller than or equal to a reference value. The side surface of the external semiconductor region is spaced apart from the edge of the waveguide group by a distance smaller than or equal to the reference value. The reference value is a maximum value of distances between arbitrary adjacent semiconductor regions in the waveguide group.

19 Claims, 14 Drawing Sheets
(2 of 14 Drawing Sheet(s) Filed in Color)

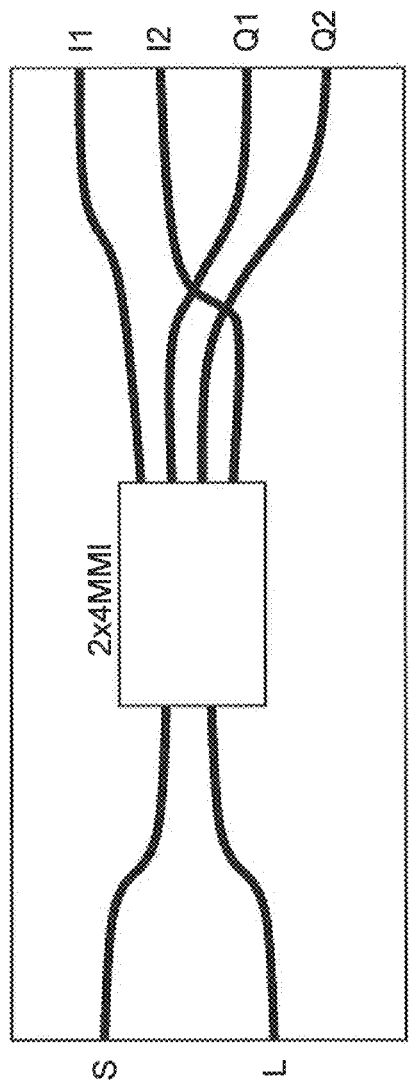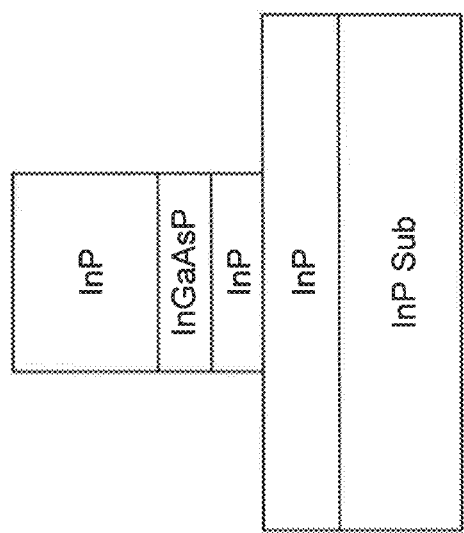
FIG. 4A
FIG. 4B

| | Waveguide width | | Waveguide width |
|---|---|---|---|
| A | 2.640 μm | F | 2.524 μm |
| B | 2.532 μm | G | 2.508 μm |
| C | 2.535 μm | H | 2.492 μm |
| D | 2.484 μm | I | 2.516 μm |
| E | 2.500 μm | J | 2.564 μm |

| | Waveguide width | | Waveguide width |
|---|---|---|---|
| A | 2.407 μm | F | 2.382 μm |
| B | 2.407 μm | G | 2.380 μm |
| C | 2.392 μm | H | 2.380 μm |
| D | 2.395 μm | I | 2.392 μm |
| E | 2.378 μm | J | 2.386 μm |

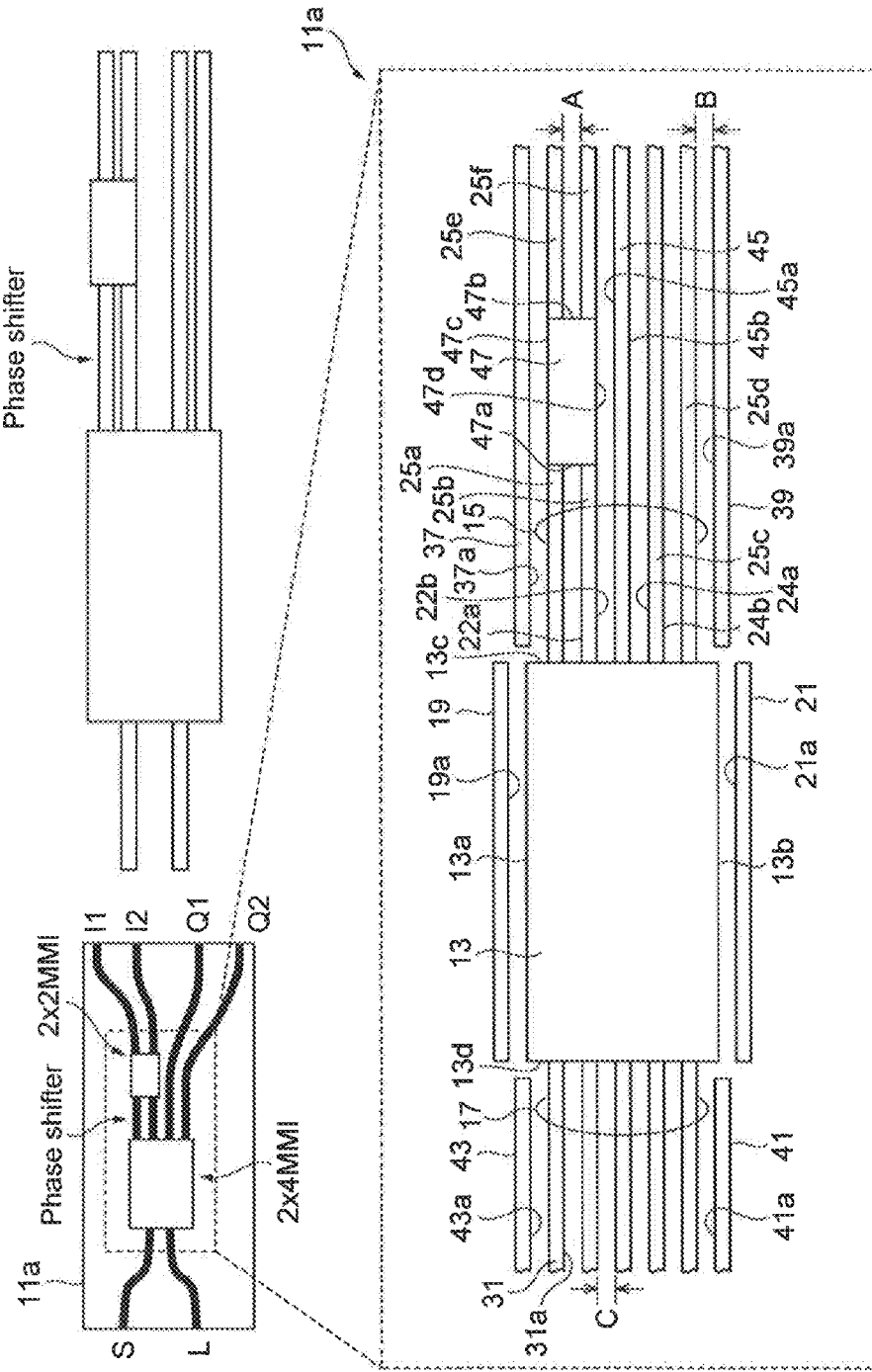

COHERENT MIXER AND 2×2 MULTI-MODE INTERFERENCE COUPLER

BACKGROUND OF THE INVENTION

1. Field of the Invention

The present invention relates to a coherent mixer and a 2×2 multi-mode interference (MMI) coupler.

2. Description of the Related Art

R. Kunkel, H-G. Bach, D. Hoffmann, and C. M. Weinert, "First monolithic InP-based 90°-hybrid OEIC comprising balanced detectors for 100GE coherent frontends", IPRM2009, TuB2.2, IEEE discloses an integrated device on which a 90 degree hybrid (90 deg hybrid) and a photodiode are monolithically integrated.

SUMMARY OF THE INVENTION

In an optical communication method using phase modulation, a coherent mixer that mixes signal light with local oscillation light is used to extract phase information on the signal light. A coherent mixer includes, for example, a waveguide that is composed of compound semiconductor or Si semiconductor. Such coherent mixers are broadly divided into two types: a multi-mode interference (MMI) type and a coupler type. For example, a coherent mixer used in quadrature phase-shift keying (QPSK) includes a 90 degree hybrid as a main component. For optical communication employing QPSK, a 90 degree hybrid is designed such that a phase difference between channels is set to 90 degrees and an output imbalance between channels is zero. Thus, it is necessary to design a plane pattern that realizes a desired phase difference and a desired output imbalance. Furthermore, for manufacturing, it is desired to find manufacturing conditions for achieving the dimensions of a designed plane pattern. As a result, it is necessary to reduce a phase shift and an imbalance shift between channels from the desired values. The phase shift and the imbalance shift are caused by, for example, dimensional errors in the plane pattern during manufacturing.

A coherent mixer according to an aspect of the present invention includes (a) a first multi-mode waveguide that has a first side surface, a second side surface, a first end, and a second end, the first side surface and the second side surface extending in a direction of a first axis, the first end and the second end extending in a direction intersecting with the first axis; (b) a first waveguide group including a plurality of semiconductor regions connected to the first end; (c) a first semiconductor region that has a side surface extending substantially parallel to the first side surface of the first multi-mode waveguide; and (d) a first external semiconductor region that is provided on an external side of the first waveguide group, the first external semiconductor region having a side surface extending substantially parallel to an edge of the first waveguide group. The side surface of the first semiconductor region is spaced apart from the first side surface of the first multi-mode waveguide by a distance smaller than or equal to a reference value. In addition, the side surface of the first external semiconductor region is spaced apart from the edge of the first waveguide group by a distance smaller than or equal to the reference value. The reference value is a maximum value of distances between arbitrary adjacent semiconductor regions in the first waveguide group.

In this coherent mixer, the side surface of the first semiconductor region extends substantially parallel to the first side surface of the first multi-mode waveguide. The side surface of the first semiconductor region is spaced apart from the first side surface of the first multi-mode waveguide by a distance smaller than or equal to the reference value. Thus, when the first multi-mode waveguide, the first waveguide group, the first semiconductor region and the first external semiconductor region are formed together by etching, the difference between the heights of the first side surface and the second side surface of the multi-mode waveguide and the heights of the plurality of semiconductor regions in the first waveguide group is reduced. As a result, the imbalance of the coherent mixer is reduced.

The coherent mixer according to the present invention may further include a second waveguide group including a plurality of semiconductor regions connected to the second end; a second semiconductor region that has a side surface extending substantially parallel to the second side surface of the first multi-mode waveguide; a second external semiconductor region that is provided on the other external side of the first waveguide group, the second external semiconductor region having a side surface extending substantially parallel to the other edge of the first waveguide group. The side surface of the second external semiconductor region is preferably spaced apart from the other edge of the first waveguide group by a distance smaller than or equal to the reference value. In addition, the side surface of the second semiconductor region is preferably spaced apart from the second side surface of the first multi-mode waveguide by a distance smaller than or equal to the reference value.

In the coherent mixer according to the present invention, the first waveguide group may include a first waveguide, a second waveguide, a third waveguide, and a fourth waveguide that are arranged at the first end in a direction intersecting with the first axis. The second waveguide group may include a fifth waveguide and a sixth waveguide that are each connected to the second end. Each of the fifth and sixth waveguides may have a first side surface and a second side surface. The coherent mixer may further include a third semiconductor region provided on an external side of the second waveguide group, the third semiconductor region having a side surface extending substantially parallel to the first side surface of the fifth waveguide; and a fourth semiconductor region provided on the other external side of the second waveguide group, the fourth semiconductor region having a side surface extending substantially parallel to the second side surface of the sixth waveguide. The side surface of the third semiconductor region is preferably spaced apart from the first side surface of the fifth waveguide by a distance smaller than or equal to the reference value. In addition, the side surface of the fourth semiconductor region is preferably spaced apart from the second side surface of the sixth waveguide by a distance smaller than or equal to the reference value.

In this coherent mixer, the side surface of the third semiconductor region extends substantially parallel to and is spaced apart from the first side surface of the fifth waveguide by a distance smaller than or equal to the reference value. The side surface of the fourth semiconductor region extends substantially parallel to and is spaced apart from the second side surface of the sixth waveguide by a distance smaller than or equal to the reference value. Thus, when the multi-mode waveguide, the first waveguide group, the second waveguide group, the first semiconductor region, the second semiconductor region, the third semiconductor region, and the fourth semiconductor region are formed together by etching, the difference between the heights of the side surfaces of the fifth waveguide and the sixth waveguide and the heights of the first side surface and the second side surface of the multi-mode waveguide may be reduced. As a result, the imbalance of the coherent mixer may be reduced.

In the coherent mixer according to the present invention, the third semiconductor region may have an end connected to the second end of the first multi-mode waveguide. According to the coherent mixer, the third semiconductor region is formed as a portion having a form similar to that of the second waveguide group and, for example, as a portion having a form of a waveguide that is not coupled to an external optical waveguide.

The coherent mixer according to the present invention may further include a fifth semiconductor region provided between the fifth and sixth waveguides, the fifth semiconductor region having a first side surface extending substantially parallel to the second side surface of the fifth waveguide and a second side surface extending substantially parallel to the first side surface of the sixth waveguide. The first side surface of the fifth semiconductor region is preferably spaced apart from the second side surface of the fifth waveguide by a distance smaller than or equal to the reference value. In addition, the second side surface of the fifth semiconductor region is preferably spaced apart from the first side surface of the sixth waveguide by a distance smaller than or equal to the reference value.

In the coherent mixer according to the present invention, each of the fourth and fifth semiconductor regions may have an end connected to the second end of the first multi-mode waveguide. According to the coherent mixer, the fourth semiconductor region and the fifth semiconductor region are formed as a portion having a form similar to that of the second group of a plurality of semiconductor regions and, for example, as a portion having a form of a waveguide that is not coupled to an external optical waveguide.

The coherent mixer according to the present invention may further include a sixth semiconductor region that is provided between the second waveguide and the third waveguide, the sixth semiconductor region having a first side surface and a second side surface. The first side surface of the sixth semiconductor region may extend substantially parallel to the side surface of the second waveguide. The second side surface of the sixth semiconductor region may extend substantially parallel to the side surface of the third waveguide. The first side surface of the sixth semiconductor region is preferably spaced apart from the side surface of the second waveguide by a distance smaller than or equal to the reference value. In addition, the second side surface of the sixth semiconductor region is preferably spaced apart from the side surface of the third waveguide by a distance smaller than or equal to the reference value.

In this coherent mixer, the sixth semiconductor region has the first side surface and the second side surface. The sixth semiconductor region is provided between the second waveguide and the third waveguide. The first side surface of the sixth semiconductor region extends substantially parallel to and is spaced apart from the side surface of the second waveguide by a distance smaller than or equal to the reference value. The second side surface of the sixth semiconductor region extends substantially parallel to and is spaced apart from the side surface of the third waveguide by a distance smaller than or equal to the reference value. The difference between the height of the side surface of the second waveguide, the height of the side surface of the third waveguide, and the heights of the first side surface and the second side surface of the first multi-mode waveguide may be reduced. As a result, the imbalance of the coherent mixer may be reduced.

The coherent mixer according to the present invention may further include a second multi-mode waveguide connected to an end of the first waveguide and an end of the second waveguide. The second multi-mode waveguide may have a first side surface extending substantially parallel to the first side surface of the sixth semiconductor region. In addition, the first side surface of the sixth semiconductor region is preferably spaced apart from the first side surface of the second multi-mode waveguide by a distance smaller than or equal to the reference value.

In this coherent mixer, the second multi-mode waveguide connected to the end of the first waveguide and the end of the second waveguide. The first side surface of the second multi-mode waveguide extends substantially parallel to and is spaced apart from the first side surface of the sixth semiconductor region by a distance smaller than or equal to the reference value. The difference between the heights of the first side surface and the second side surface of the second multi-mode waveguide may be reduced. As a result, the imbalance of the coherent mixer may be reduced.

In the coherent mixer according to the present invention, the first semiconductor region may have a waveguide structure that is substantially the same as the structure of the first multi-mode semiconductor waveguide.

A 2×2 multi-mode interference coupler according to another aspect of the present invention includes a multi-mode waveguide that has a first side surface, a second side surface, a first end, and a second end, the first side surface and the second side surface extending in a direction of a first axis, the first end and the second end extending in a direction intersecting with the first axis; a first waveguide that has an end connected to the first end; a second waveguide that has an end connected to the first end, the second waveguide being spaced apart from the first waveguide by a first distance value at the first end; a third waveguide that has an end connected to the second end; a fourth waveguide that has an end connected to the second end, the fourth waveguide being spaced apart from the third waveguide by a second distance value at the second end; a first semiconductor region that has a side surface extending in a direction substantially parallel to the first side surface of the multi-mode waveguide; and a second semiconductor region that has a side surface extending in a direction substantially parallel to the second side surface of the multi-mode waveguide. The side surface of the first semiconductor region is spaced apart from the first side surface of the multi-mode waveguide by a distance smaller than or equal to the reference value. The side surface of the second semiconductor region is spaced apart from the second side surface of the multi-mode waveguide by a distance smaller than or equal to the reference value. The reference value is a greater one of the first distance value and the second distance value.

In this 2×2 multi-mode interference coupler, the distance between the first side surface of the multi-mode waveguide and the side surface of the first semiconductor region is smaller than or equal to the reference value. In addition, the distance between the second side surface of the multi-mode waveguide and the side surface of the second semiconductor region is smaller than or equal to the reference value. Thus, the difference between the heights of the first side surface and the second side surface of the multi-mode waveguide and the heights of the first waveguide, the second waveguide, the third waveguide, and the fourth waveguide may be reduced. Providing the first semiconductor region and the second semiconductor region that extend substantially parallel to the first side surface and the second side surface of the multi-mode waveguide, respectively, may reduce effect of this difference in height on interference occurring in the multi-mode waveguide.

BRIEF DESCRIPTION OF THE DRAWINGS

This patent or application file contains at least one drawing executed in varying shades of gray (gray-scale). Copies of this patent or patent application publication with the gray-scale drawings will be provided by the Office upon request and payment of the necessary fee.

FIG. 1 is a diagram illustrating an example of a coherent mixer according to an embodiment.

FIGS. 4A and 4B illustrate a 2×4 MMI-type 90 degree hybrid.

FIGS. 9A to 9C are diagrams illustrating the structure of an MMI coupler according to an embodiment.

DESCRIPTION OF THE PREFERRED EMBODIMENTS

Figure 1:
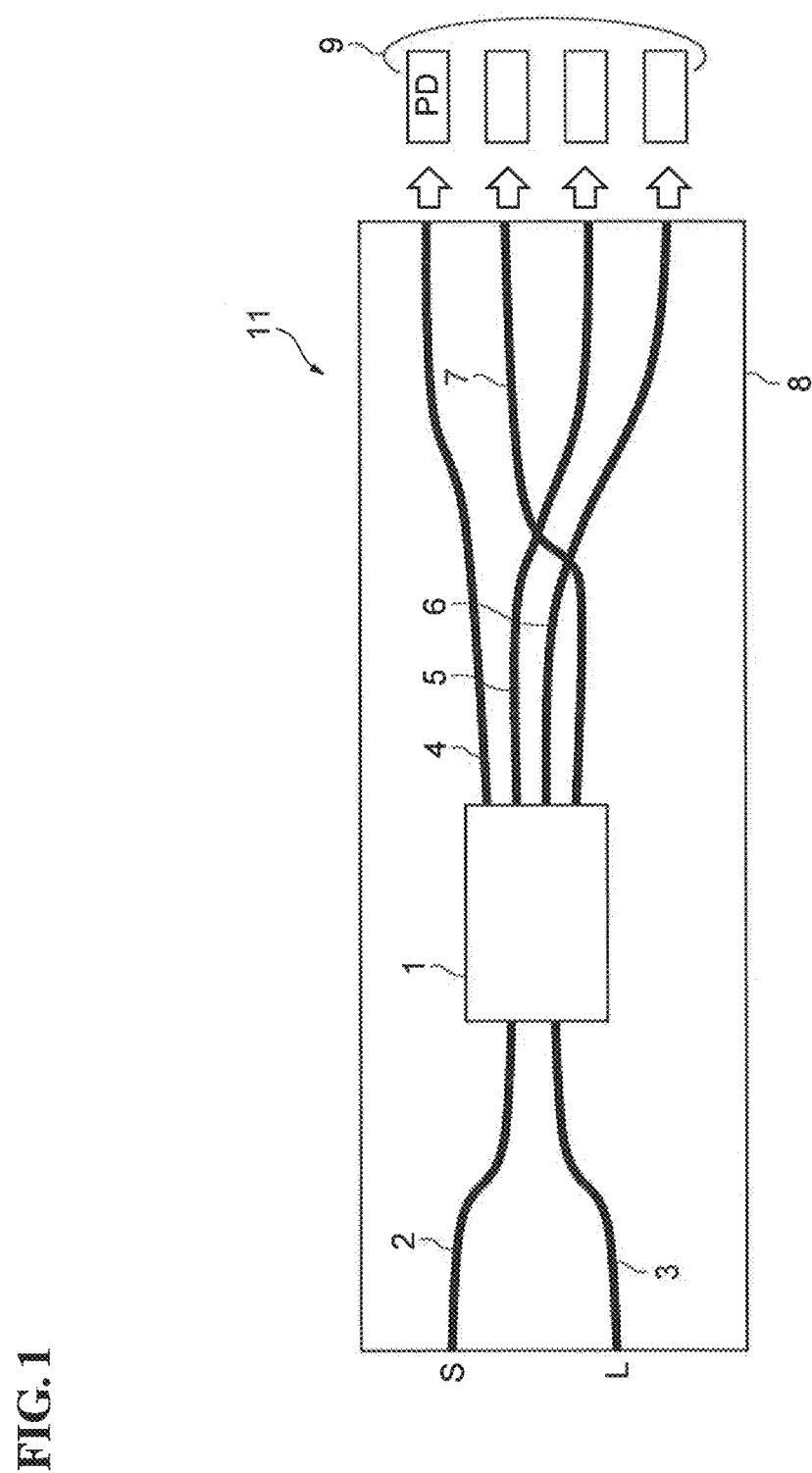

Embodiments of a coherent mixer and a 2×2 multi-mode interference (MMI) coupler according to the present invention will be described with reference to attached drawings. If possible, identical portions are denoted by the same reference numerals.

FIG. 1 is a diagram illustrating an example of a coherent mixer. A coherent mixer 11 includes an MMI coupler 1, a first input waveguide 2, a second input waveguide 3, a first output waveguide 4, a second output waveguide 5, a third output waveguide 6, a fourth output waveguide 7, and a photodetector 9. The first input waveguide 2 and the second input waveguide 3 are connected to an input terminal 1a of the MMI coupler 1. The first output waveguide 4, the second output waveguide 5, the third output waveguide 6, and the fourth output waveguide 7 are connected to an output terminal 1b of the MMI coupler 1. The photodetector 9 receives an optical signal via these waveguides (the first output waveguide 4, the second output waveguide 5, the third output waveguide 6, and the fourth output waveguide 7). The MMI coupler 1, the first input waveguide 2, the second input waveguide 3, the first output waveguide 4, the second output waveguide 5, the third output waveguide 6, and the fourth output waveguide 7 form a 90 degree hybrid and are provided on a semiconductor substrate 8. In addition to the 90 degree hybrid, the photodetector 9 is also provided on the semiconductor substrate 8. The photodetector 9 includes, for example, four photodiodes 9a, 9b, 9c, and 9d. The first input waveguide 2, the second input waveguide 3, the first output waveguide 4, the second output waveguide 5, the third output waveguide 6, and the fourth output waveguide 7 form, for example, a single-mode waveguide. The MMI coupler 1 includes a multi-mode waveguide.

Figure 2:
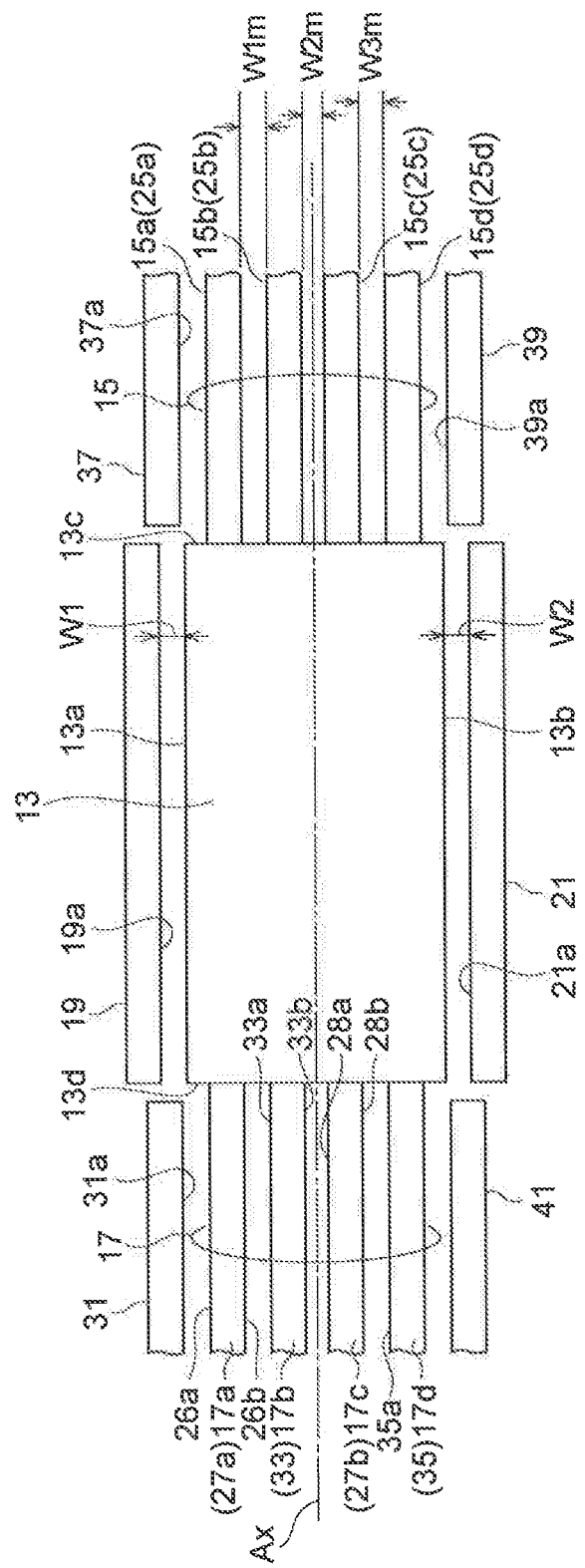
FIG. 2 is a diagram illustrating an example of a multi-mode interference coupler of the coherent mixer.

FIG. 2 is a diagram illustrating an example of the MMI coupler 1 of the coherent mixer 11. The MMI coupler 1 includes a multi-mode waveguide 13, a first group of semiconductor regions 15, a second group of semiconductor regions 17, a first semiconductor region 19, and a second semiconductor region 21. The multi-mode waveguide 13 has a first side surface 13a and a second side surface 13b that extend in a direction of a first axis Ax and a first end 13c and a second end 13d that extend in a direction intersecting with the first axis Ax. The first group of semiconductor regions 15 is connected to the first end 13c of the multi-mode waveguide 13. The second group of semiconductor regions 17 is connected to the second end 13d of the multi-mode waveguide 13. The first semiconductor region 19 has a side surface 19a. The side surface 19a of the first semiconductor region 19 extends substantially parallel to the first side surface 13a of the multi-mode waveguide 13. The second semiconductor region 21 has a side surface 21a. The side surface 21a of the second semiconductor region 21 extends substantially parallel to the second side surface 13b of the multi-mode waveguide 13. In the embodiment, the first semiconductor region 19 and the second semiconductor region 21 have a waveguide structure that is substantially the same as or similar to the structure of the multi-mode semiconductor waveguide 13. In addition, the first semiconductor region 19 and the second semiconductor region 21 may have a width similar to that of the semiconductor regions 15a to 15d in the first group of semiconductor regions 15, each of which has a width smaller than that of the multi-mode semiconductor waveguide 13. Furthermore, the first semiconductor region 19 and the second semiconductor region 21 may have a width lager than that of the semiconductor regions 15a to 15d in the first group of semiconductor regions 15. The first group of semiconductor regions 15 includes m waveguides (first to m-th waveguides). Examples of the first to m-th waveguides include semiconductor regions 15a, 15b, 15c, and 15d. The second group of semiconductor regions 17 includes n waveguides (first to n-th waveguides). Examples of the first to n-th waveguides include semiconductor regions 17a, 17b, 17c, and 17d. Here, n is greater than or equal to m (n≥m). Preferably, n is equal to the number m (n=m). A distance W1 between the first side surface 13a of the multi-mode waveguide 13 and the side surface 19a of the first semiconductor region 19 is smaller than or equal to a reference value WR. In addition, a distance W2 between the second side surface 13b of the multi-mode waveguide 13 and the side surface 21a of the second semiconductor region 21 is smaller than or equal to the reference value WR. The reference value WR is a maximum value of distances between arbitrary semiconductor regions that are next to each other among the first group of semiconductor regions 15. In addition, when there are two or more distances of a maximum value, the maximum value is used as the reference value WR. Alternatively, a minimum value of distances between arbitrary two waveguides that are next to each other among the first to m-th waveguides may also be used as the reference value WR. In an embodiment illustrated in FIG. 2, four semiconductor regions 15a, 15b, 15c, and 15d are included as the first to m-th waveguides. An additional semiconductor region is spaced apart from a side surface of a semiconductor portion included in the coherent mixer 11 or connected to the coherent mixer 11 by a distance smaller than or equal to the reference value WR.

In this embodiment, all the semiconductor regions among the first group of semiconductor regions 15 are connected to the first end 13c of the multi-mode waveguide 13. However, at least one of the semiconductor regions among the first group of semiconductor regions 15 has only to be connected to the first end 13c of the multi-mode waveguide 13. Here, each of the semiconductor regions among the first group of semiconductor regions 15 has a portion that extends in the direction of the first axis Ax. The semiconductor regions among the first group of semiconductor regions 15 are preferably arranged at the first end 13c of the multi-mode waveguide 13 at a predetermined pitch. Here, the first group of semiconductor regions 15 has been described. Preferably, the same description may also be applied to the second group of semiconductor regions 17.

The coherent mixer 11 includes a first external semiconductor region 37 and a second external semiconductor region 39. The first external semiconductor region 37 is provided on one of external sides of the first group of semiconductor regions 15. The first external semiconductor region 37 includes a side surface 37a, which extends in the direction of the first axis Ax. The side surface 37a is spaced apart from an outermost semiconductor side surface (an edge) on this external side by a distance smaller than or equal to the reference value WR. The second external semiconductor region 39 is provided on the other one of the external sides of the first group of semiconductor regions 15. The second external semiconductor region 39 has a side surface 39a, which extends in the direction of the first axis Ax. The side surface 39a is spaced apart from an outermost semiconductor side surface (an edge) on the other external side by a distance smaller than or equal to the reference value WR. In the embodiment, the first external semiconductor region 37 and the second external semiconductor region 39 have a waveguide structure that is substantially the same as or similar to the structure of the semiconductor regions 15a, 15b, 15c, and 15d in the first group of semiconductor regions 15. In addition, the first external semiconductor region 37 and the second external semiconductor region 39 have a shape and a width that is substantially the same as or similar to that of the semiconductor regions 15a, 15b, 15c, and 15d in the first group of semiconductor regions 15.

In the coherent mixer 11, the first side surface 13a of the multi-mode waveguide 13 is spaced apart from the side surface 19a of the first semiconductor region 19, which extends substantially parallel to the first side surface 13a, by a distance smaller than or equal to the reference value WR. Furthermore, the second side surface 13b of the multi-mode waveguide 13 is spaced apart from the side surface 21a of the second semiconductor region 21, which extends substantially parallel to the second side surface 13b, by a distance smaller than or equal to the reference value WR. Thus, when the multi-mode waveguide 13, the first group of semiconductor regions 15, the first semiconductor region 19, and the second semiconductor region 21 are formed together by etching, the difference between the heights of the first side surface 13a and the second side surface 13b of the multi-mode waveguide 13 and the heights of the first to m-th waveguides (for example, the semiconductor regions 15a, 15b, 15c, and 15d) may be reduced. As a result, the imbalance of the coherent mixer 11 may be reduced.

The distance between two adjacent waveguides connected to one end of the MMI coupler 1 is smaller than or equal to the distance between adjacent waveguides connected to the other end of the MMI coupler 1. A distance $W1m$ between the semiconductor region 15a and the semiconductor region 15b, a distance $W2m$ between the semiconductor region 15b and the semiconductor region 15c, and a distance $W3m$ between the semiconductor region 15c and the semiconductor region 15d are designed to be the same value. However, as a result of manufacturing, the semiconductor regions 15a to 15d are not formed in the same form. The differences among the semiconductor regions 15a to 15d in shape or dimensions are caused by a manufacturing error, for example. Therefore, the distance $W1m$, the distance $W2m$, and the distance $W3m$ are not the same value although the difference therebetween may be small. In such an MMI coupler, a maximum value of the distance $W1m$, the distance $W2m$, and the distance $W3m$ may be defined as the reference value WR. Alternatively, a minimum value of the distance $W1m$, the distance $W2m$, and the distance $W3m$ may also be defined as the reference value WR.

In this embodiment, the first external semiconductor region 37 of the coherent mixer 11 is another unit provided separately from the first semiconductor region 19. However, the first external semiconductor region 37 and the first semiconductor region 19 may also be created as a single unit. Similarly, the second external semiconductor region 39 of the coherent mixer 11 is another unit provided separately from the second semiconductor region 21. However, the second external semiconductor region 39 and the second semiconductor region 21 may also be created as a single unit.

In the coherent mixer 11 that includes a 2×4 MMI coupler, the first group of semiconductor regions 15 includes a waveguide 25a, a waveguide 25b, a waveguide 25c, and a waveguide 25d. The waveguide 25a, the waveguide 25b, the waveguide 25c, and the waveguide 25d are arranged at the first end 13c of the multi-mode waveguide 13 in this order. Preferably, the waveguide 25a, the waveguide 25b, the waveguide 25c, and the waveguide 25d are arranged at a predetermined pitch in a direction intersecting with a waveguide direction (that extends along the direction of the first axis Ax). The second group of semiconductor regions 17 includes a waveguide 27a (17a) and a waveguide 27b (17c). The waveguide 27a is connected to the second end 13d of the multi-mode waveguide 13. The waveguide 27a has a first side surface 26a and a second side surface 26b. The waveguide 27b is connected to the second end 13d of the multi-mode waveguide 13. The waveguide 27b has a first side surface 28a and a second side surface 28b.

The coherent mixer 11 includes a third semiconductor region 31. The third semiconductor region 31 has a side surface 31a. The side surface 31a extends substantially parallel to the first side surface 26a of the waveguide 27a, and extends in the direction of the first axis Ax in this embodiment.

The coherent mixer 11 includes a fourth semiconductor region 33. The fourth semiconductor region 33 has a first side surface 33a and a second side surface 33b. The first side surface 33a extends substantially parallel to the second side surface 26b of the waveguide 27a, and extends in the direction of the first axis Ax in this embodiment. The second side surface 33b extends substantially parallel to the first side surface 28a of the waveguide 27b, and extends in the direction of the first axis Ax in this embodiment.

The coherent mixer 11 includes a fifth semiconductor region 35, and the fifth semiconductor region 35 has a side surface 35a. The side surface 35a extends substantially parallel to the second side surface 28b of the waveguide 27b, and extends in the direction of the first axis Ax in this embodiment.

In the embodiment, the third semiconductor region 31, the fourth semiconductor region 33, and the fifth semiconductor region 35 have a waveguide structure that is substantially the same as or similar to the structure of the semiconductor region 17a (semiconductor waveguide 27a) and the semiconductor region 17c (semiconductor waveguide 27b) in the second group of semiconductor regions 17. In addition, the third semiconductor region 31, the fourth semiconductor region 33, and the fifth semiconductor region 35 have a shape and a width that is substantially the same as or similar to that of the semiconductor region 17a (semiconductor waveguide 27a) and the semiconductor region 17c (semiconductor waveguide 27b) in the second group of semiconductor regions 17.

In the coherent mixer 11, the side surface 31a of the third semiconductor region 31 extends substantially parallel to and is spaced apart from the first side surface 26a of the waveguide 27a by a distance smaller than or equal to the reference value WR. The first side surface 33a of the fourth semiconductor region 33 extends substantially parallel to and is spaced apart from the second side surface 26b of the waveguide 27a by a distance smaller than or equal to the reference value WR. The second side surface 33b of the fourth semiconductor region 33 extends substantially parallel to and is spaced apart from the first side surface 28a of the waveguide 27b by a distance smaller than or equal to the reference value WR. The side surface 35a of the fifth semiconductor region 35 extends substantially parallel to and is spaced apart from the second side surface 28b of the waveguide 27b by a distance smaller than or equal to the reference value WR. Thus, when the multi-mode waveguide 13, the first group of semiconductor regions 15, the second group of semiconductor regions 17, the first semiconductor region 19, the second semiconductor region 21, the third semiconductor region 31, the fourth semiconductor region 33, and the fifth semiconductor region 35 are formed together by etching, the difference between the heights of the first side surfaces 26a and 28a and the second side surfaces 26b and 28b of the waveguide 27a and the waveguide 27b and the heights of the first side surface 13a and the second side surface 13b of the multi-mode waveguide 13 may be reduced. As a result, the imbalance of the coherent mixer 11 may be reduced.

In the coherent mixer 11 according to this embodiment, an end of the fourth semiconductor region 33 and an end of the fifth semiconductor region 35 are connected to the second end 13d of the multi-mode waveguide 13. The fourth semiconductor region 33 and the fifth semiconductor region 35 may also be created in a form similar to that of the first to n-th waveguides (for example, the semiconductor regions 17a and 17c) in the second group of semiconductor regions 17, that is, such that the fourth semiconductor region 33 and the fifth semiconductor region 35 have a form of a waveguide that is not connected to an external waveguide.

Alternatively, the fourth semiconductor region 33 may be provided such that the end of the fourth semiconductor region 33 is spaced apart from the second end 13d of the multi-mode waveguide 13. Similarly, the fifth semiconductor region 35 may be provided such that the end of the fifth semiconductor region 35 is spaced apart from the second end 13d of the multi-mode waveguide 13. Moreover, in this embodiment, the third semiconductor region 31 is spaced apart from the first semiconductor region 19. However, the third semiconductor region 31 and the first semiconductor region 19 may also be connected to each other and formed as a single semiconductor region. In addition, when a distance between the waveguide 27a and the waveguide 27b is narrower than the reference value WR, the fourth semiconductor region 33 may be not formed between the waveguide 27a and the waveguide 27b.

Figure 3C:
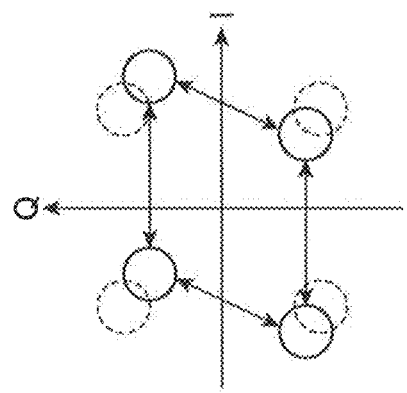
FIGS. 3A to 3C are diagrams illustrating a constellation in an MMI-type 90 degree hybrid, which has received a QPSK signal.
Figure 3B:
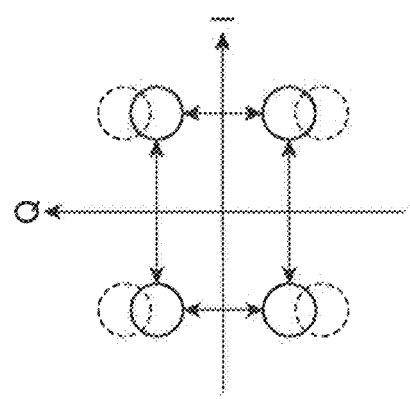
Figure 3A:
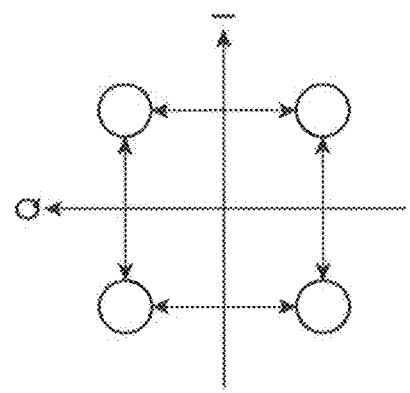

In an MMI-type 90 degree hybrid, signal light S input from a port 2 illustrated in FIG. 1 interferes with local oscillation light L input from a port 3, and output light is generated whose optical phases for four output ports are shifted by 90 degrees from each other. The MMI-type 90 degree hybrid generates light having a light intensity that changes with a phase difference between the signal light S and the local oscillation light L and outputs the light to the four output ports. Light output from the four output ports of the MMI-type 90 degree hybrid propagates through the first to fourth output waveguides 4, 5, 6, and 7. The MMI-type 90 degree hybrid may convert phase information on signal light into intensity information. Light obtained by converting phase information on signal light into intensity information with the MMI-type 90 degree hybrid is received by the photodetector 9. When an MMI coupler or waveguides connected to the MMI coupler have a different structure from a desired structure, a phase difference between signal light and local oscillation light is not accurately converted into a light intensity. As a result, failures such as crosstalk between channels, a decrease in reception sensitivity, and the like may occur. FIGS. 3A to 3C illustrate constellation diagrams in an MMI-type 90 degree hybrid, which has received a QPSK signal. As illustrated in FIG. 3A, when an ideal QPSK signal has been received, the constellation diagram illustrates symbols that are equally spaced apart and to each of which the distance from the coordinate center is identical. The greater the distance from each coordinate axis, the higher the reception sensitivity. When an imbalance is generated between channels, the symbols are shifted from ideal positions and the distances between the symbols become uneven as illustrated in FIG. 3B. In addition, when a phase shift occurs between channels, as illustrated in FIG. 3C, the symbols are shifted from the ideal positions and the distances between the symbols become uneven in a form that is different from that of FIG. 3B. This unevenness reduces reception sensitivity.

FIGS. 4A and 4B illustrate a conventional 2×4 MMI-type 90 degree hybrid in which additional waveguides are not provided. FIG. 4A illustrates a structure of the 2×4 MMI-type 90 degree hybrid. FIG. 4B illustrates a cross-sectional view of a waveguide shown in FIG. 4A. In FIG. 4A, input ports are denoted by S and L, and output ports are denoted by I1, I2, Q1, and Q2. In order to easily compare characteristics of the MMI-type 90 degree hybrid shown in FIGS. 4A and 4B with those of MMI-type 90 degree hybrid in the embodiment, the 2×4 MMI-type 90 degree hybrid shown in FIGS. 4A and 4B has a device structure similar to that of the embodiment illustrated in FIG. 2. In the following, an example of a device structure of the 2×4 MMI-type 90 degree hybrid shown in FIGS. 4A and 4B is described.

Substrate: a semi-insulating InP substrate
Waveguide Structure:
    an i-InP cladding layer (thickness: 1.2 µm)/an i-InGaAsP core layer (thickness: 0.3 µm, band gap wavelength $\lambda g$=1.2 µm)/an i-InP cladding layer (thickness: 1.0 µm)

Waveguide Width (a single-mode waveguide): 2.5 µm
Mesa Height: 2.2 µm
MMI Structure:
　A layer structure and a mesa height are the same as those of the waveguide structure.
　Width: 20 µm
　Length: 806 µm When a photodiode is integrated, the following waveguide structure is used. A mesa structure is provided on an InP substrate. The mesa structure includes an n-InP layer, an undoped InGaAs absorption layer, a p-InP layer, and a p-InGaAs layer. A side surface of the mesa structure is covered with an i-InP layer.

Figure 5:
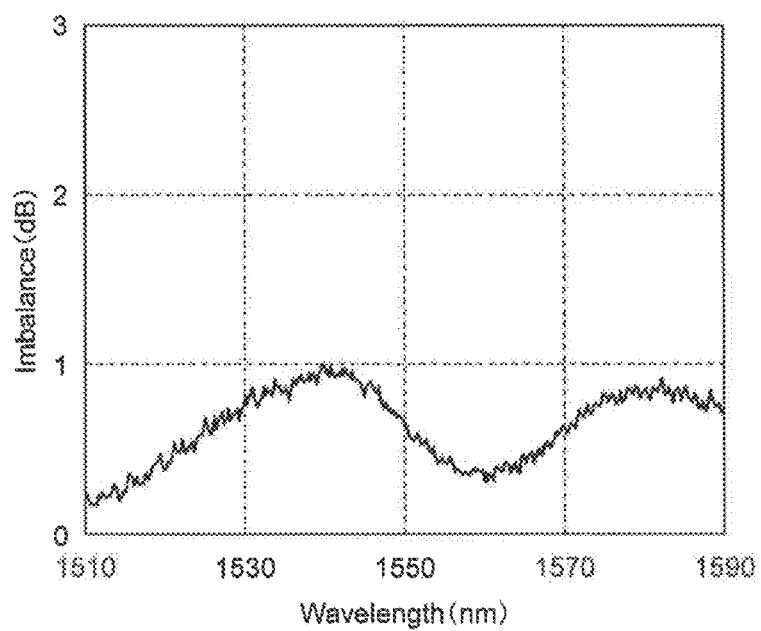
FIG. 5 is a diagram illustrating characteristics of imbalance between I channels (the absolute value of I1-I2) in the case where light enters from an input port of the 2×4 MMI-type 90 degree hybrid illustrated in FIG. 4.

FIG. 5 illustrates characteristics of imbalance between I channels (the absolute value of I1-I2) when light enters from the input port L of the 2×4 MMI-type 90 degree hybrid illustrated in FIGS. 4A and 4B. Ideally, the imbalance is 0 dB. To form the 2×4 MMI-type 90 degree hybrid illustrated in FIGS. 4A and 4B (processing by etching), manufacturing conditions have been carefully selected such that the dimensions of a designed plane pattern are realized. However, as a result of evaluation of characteristics of the 2×4 MMI-type 90 degree hybrid, an imbalance fluctuates in a C band (wavelength range: 1530 nm to 1565 nm). In addition, a maximum value of the imbalance is about 1 dB.

Figure 6:
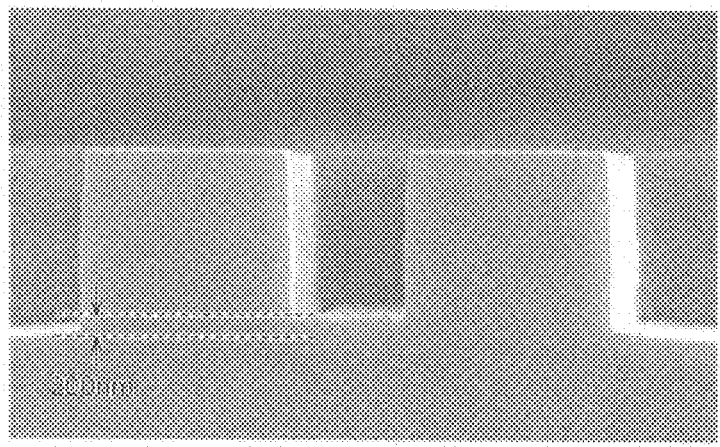
FIG. 6 is a diagram illustrating a cross-sectional form of input and output waveguides near an MMI coupler of the 2×4 MMI-type 90 degree hybrid illustrated in FIG. 4.

FIG. 6 illustrates an image of a cross section observed with a scanning electron microscope (SEM) for input and output waveguides near the MMI coupler of the 2×4 MMI-type 90 degree hybrid illustrated in FIGS. 4A and 4B. In the cross-sectional form, a mesa height of a left-side surface of a waveguide is different from that of a right-side surface of the waveguide. The differences in the mesa heights between the left-side and right-side surfaces of the waveguide occur because of manufacturing variations. Specifically, a difference of about 100 nm to 200 nm in height is generated for a mesa height of 2.2 µm. Thus, the form of the waveguide is asymmetrical. A similar difference also occurs between the height of a side surface of the MMI coupler and that of a side surface of a mesa waveguide.

A shift from a theoretical value (a design value) of MMI characteristics is considered to be caused by, for example, the difference of the heights of side surfaces between the MMI coupler and the waveguide connected to the MMI coupler. When a waveguide form is asymmetrical in the waveguide, the MMI coupler, or both, an unstable mode is excited in the waveguide, the MMI coupler, or both. As a result, an output imbalance of a 90 degree hybrid is shifted from a theoretical value. More specifically, a mode excited in an asymmetrical waveguide enters the MMI coupler and an image formed at an output end of the MMI coupler is distorted. As a result, a balance between output waveguides may be lost in terms of coupling efficiency. Alternatively, when light output from the MMI coupler is coupled to a waveguide, the light has a mode shape that is not matched with an asymmetrical waveguide form, thereby losing a balance in terms of coupling efficiency. Due to these causes, a shift from a theoretical value (a design value) occurs in MMI characteristics (an imbalance between output channels).

In forming the 2×4 MMI-type 90 degree hybrid illustrated in FIG. 2, an additional semiconductor pattern is configured in consideration of the entire symmetry such that the additional semiconductor pattern includes a semiconductor region 41 in addition to the first to fifth semiconductor regions 19, 21, 31, 33, and 35 and the first and second external semiconductor regions 37 and 39. Such an additional semiconductor pattern (a dummy pattern region) is arranged around optical waveguides originally included in the 2×4 MMI-type 90 degree hybrid. The third semiconductor region 31 and the semiconductor region 41 serve as a pair of external semiconductor regions for the second group of semiconductor regions 17. The composition and film thickness of the optical waveguides in the 2×4 MMI-type 90 degree hybrid of this case are the same as those of a 2×4 MMI-type 90 degree hybrid that does not include the additional semiconductor pattern. The distance between an input waveguide and the additional semiconductor pattern of the MMI coupler, the distance between an output waveguide and the additional semiconductor pattern of the MMI coupler, and the distance between a multi-mode waveguide and the additional semiconductor pattern of the MMI coupler are the same as a minimum value of gaps between adjacent waveguides in the input waveguides and in the output waveguides of the MMI coupler. The width of a waveguide (a dummy waveguide) that is provided on an external side of a waveguide but not used as an optical waveguide is designed to have the same value as the width of an input waveguide and that of an output waveguide of the MMI coupler. However, the width of a waveguide that is not used as an optical waveguide is not limited to this. In forming a 2×4 MMI-type 90 degree hybrid, in order to prevent a waveguide from being formed in an asymmetrical form, control of the gaps is more important in addition to control of the width of a waveguide that is not used as an optical waveguide.

Figures 7A, 7B, 7C:
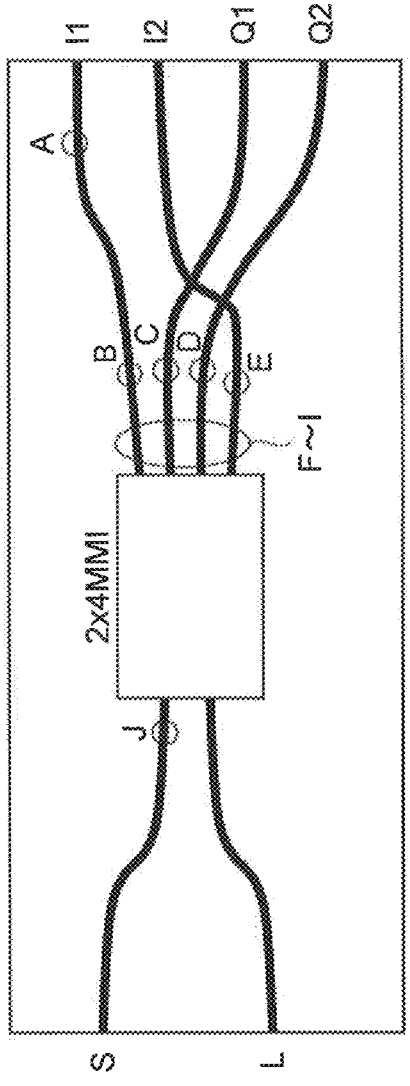
FIGS. 7A to 7C are diagrams illustrating results obtained by measuring the width of the waveguide in an example in which additional waveguides are provided and in an example in which additional waveguides are not provided.
Figure 8C:
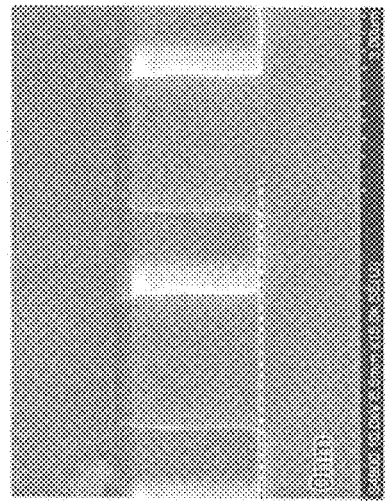
FIGS. 8B and 8C are diagrams illustrating an image of a cross section observed with a scanning electron microscope in the example in which additional waveguides are provided.
Figure 8B:
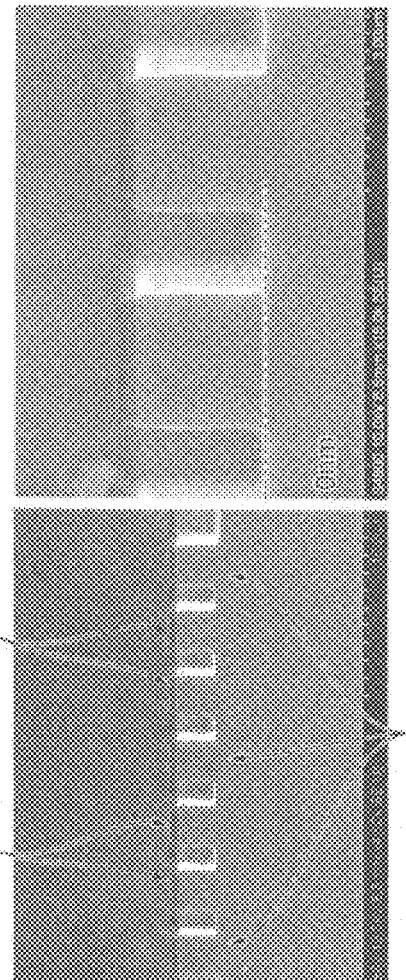
Figure 8A:
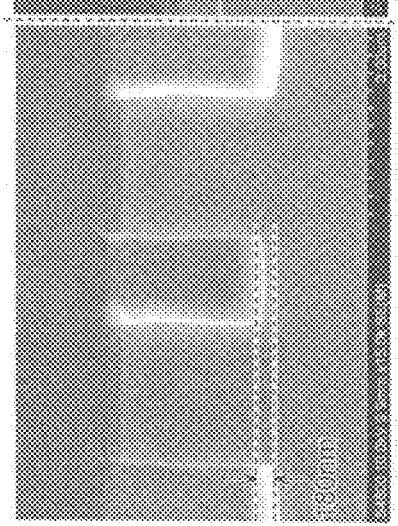
FIG. 8A is a diagram illustrating an image of a cross section observed with a scanning electron microscope in the example in which additional waveguides are not provided.

FIGS. 7A to 7C illustrate results obtained by measuring the width of the waveguide in an example. FIG. 7A shows the structure of the 2×4 MMI-type 90 degree hybrid and measuring points in the example. FIG. 7B shows the measuring result of the width of the waveguide at each measuring point for the 2×4 MMI-type 90 degree hybrid without the additional waveguide. FIG. 7C shows the measuring result of the width of the waveguide at each measuring point for the 2×4 MMI-type 90 degree hybrid with the additional waveguides illustrated in FIG. 2 in the embodiment. In accordance with the results shown in FIGS. 7B and 7C, the variation in the width of waveguides is reduced on average from 156 nm to 30 nm by providing the additional waveguides. In addition, FIGS. 8A, 8B, and 8C illustrate images of a cross section observed with a scanning electron microscope (SEM) in the example. FIG. 8A shows the image for the 2×4 MMI-type 90 degree hybrid without the additional waveguide which is substantially the same image as the image shown in FIG. 6. FIGS. 8B and 8C show the images for the 2×4 MMI-type 90 degree hybrid illustrated in FIG. 2 in which additional waveguides are provided. FIG. 8C is the image obtained by enlarging the image shown in FIG. 8B. As a result of application of the additional semiconductor regions, a single-mode waveguide has substantially the same height of a side surface as the height of a side surface of a multi-mode waveguide. That is, the degree of symmetry of a single waveguide may be improved and also the degree of evenness in the height of side surfaces between different waveguides may be improved by the application of the additional semiconductor regions. In observation with a scanning electron microscope, the variation in the height of side surfaces of waveguides is reduced from 156 nm to almost 0 nm as a result of the application of the additional semiconductor regions.

In a 2×4 MMI-type 90 degree hybrid that has such an additional semiconductor regions, the imbalance between I channels in the C band is reduced to 0.4 dB at maximum. The reduction in the imbalance is because of the following reasons. That is, the widths of waveguides are made uniform and side surfaces have a symmetrical form with respect to height by providing the additional semiconductor region. Control of a pattern form of such a waveguide makes occurrence of unstable mode excitation less likely.

The example described so far in which additional semiconductor regions are added next to waveguides in the 2×4 MMI-type 90 degree hybrid is not limited to a specific structure illustrated in FIG. 2.

FIGS. 9A to 9C are diagrams illustrating the structure of an MMI-type 90 degree hybrid. In FIG. 9A, a semiconductor region having a function the same as or similar to that of a semiconductor region of the MMI-type 90 degree hybrid illustrated in FIG. 2 is denoted by the same reference numeral. FIG. 9B illustrates the entirety of a device. FIG. 9C illustrates an MMI-type 90 degree hybrid that does not include an additional semiconductor region (additional waveguides). In a coherent mixer 11a illustrated in FIG. 9A, an end of the third semiconductor region 31 is connected to the second end 13d of the multi-mode waveguide 13. In addition, the third semiconductor region 31 may be formed in a form similar to that of the second group of semiconductor regions 17. Here, the coherent mixer 11a includes an external semiconductor region 41 that has an inner-side surface 41a and an external semiconductor region 43 that has an inner-side surface 43a. That is, the external semiconductor region 41 and the external semiconductor region 43 for the second end 13d are provided around the multi-mode waveguide 13 so as to match the arrangement of the semiconductor regions 37 and 39 for the first end 13c.

In the coherent mixer 11a, the waveguide 25b has a side surface 22a and a side surface 22b, which is the other side surface. The waveguide 25c has a side surface 24a and a side surface 24b, which is the other side surface. Furthermore, the coherent mixer 11a includes a sixth semiconductor region 45. The sixth semiconductor region 45 has a first side surface 45a and a second side surface 45b. The sixth semiconductor region 45 is provided between the side surface 22b of the waveguide 25b and the side surface 24a of the waveguide 25c. The first side surface 45a extends substantially parallel to the side surface 22b of the waveguide 25b. The second side surface 45b extends substantially parallel to the side surface 24a of the waveguide 25c. The distance between the first side surface 45a of the sixth semiconductor region 45 and the side surface 22b of the waveguide 25b is smaller than or equal to the reference value WR. The distance between the second side surface 45b of the sixth semiconductor region 45 and the side surface 24a of the waveguide 25c is smaller than or equal to the reference value WR.

In the coherent mixer 11a, the sixth semiconductor region 45 has the first side surface 45a and the second side surface 45b. The sixth semiconductor region 45 is provided between the side surface 22b of the waveguide 25b and the side surface 24a of the waveguide 25c. The first side surface 45a extends substantially parallel to and is spaced apart from the side surface 22b of the waveguide 25b by a distance smaller than or equal to the reference value WR. The second side surface 45b extends substantially parallel to and is spaced apart from the side surface 24a of the waveguide 25c by a distance smaller than or equal to the reference value WR. Therefore, the difference between the height of the side surface 22b of the waveguide 25b, the height of the side surface 24a of the waveguide 25c, and the heights of side surfaces of the other waveguides may be reduced. As a result, the imbalance of the coherent mixer 11a may be reduced.

The coherent mixer 11a may further include a multi-mode waveguide 47, which is another multi-mode waveguide. An end of the waveguide 25a and an end of the waveguide 25b are connected to an end 47a of the multi-mode waveguide 47. In addition, an end of a waveguide 25e and an end of a waveguide 25f are connected to the other end 47b of the multi-mode waveguide 47. In this example, the waveguide 25a operates as a phase shifter. The distance between the waveguide 25e and the waveguide 25f is smaller than or equal to the reference value WR. A side surface 47c of the multi-mode waveguide 47 extends substantially parallel to the side surface 37a of the semiconductor region 37. In addition, a side surface 47d of the multi-mode waveguide 47 extends substantially parallel to a side surface 45a of the sixth semiconductor region 45. The side surface 47c of the multi-mode waveguide 47 is spaced apart from the side surface 37a of the semiconductor region 37 by a distance smaller than or equal to the reference value WR. In addition, the side surface 47d of the multi-mode waveguide 47 is spaced apart from the side surface 45a of the sixth semiconductor region 45 by a distance smaller than or equal to the reference value WR. Therefore, the difference between the height of the side surface 47c of the multi-mode waveguide 47 and the height of the side surface 47d of the multi-mode waveguide 47 may be reduced. As a result, the imbalance of the coherent mixer 1a may be reduced.

A coherent mixer that includes the 90 degree hybrid equipped with a 2×4 MMI coupler and a 2×2 MMI coupler illustrated in FIGS. 9A to 9C is formed likewise. A phase shifter is provided on the 1-channel side in this 90 degree hybrid. The phase shifter has a function for adding a phase delay of 45 degrees by changing the width between adjacent waveguides or the length of a waveguide. When the amount of phase delay is shifted from 45 degrees, an output imbalance is generated in light passing through the 2×2 MMI coupler. The width of a waveguide in the phase shifter in this embodiment is smaller than the widths of the other waveguides by 30 nm. It is not easy to accurately control this small difference in the waveguide width in manufacturing process. The imbalance of an MMI coupler in which additional waveguides are not provided is 1.2 dB at maximum. In contrast, the imbalance of an MMI coupler in which additional waveguides are provided is 0.6 dB. A decrease in imbalance of the MMI coupler in the embodiment is caused because the widths and forms of waveguides of the MMI coupler are uniformly formed by providing the additional waveguides. As a result, the 90 degree hybrid in the embodiment has a desired amount of phase delay.

Figure 10:
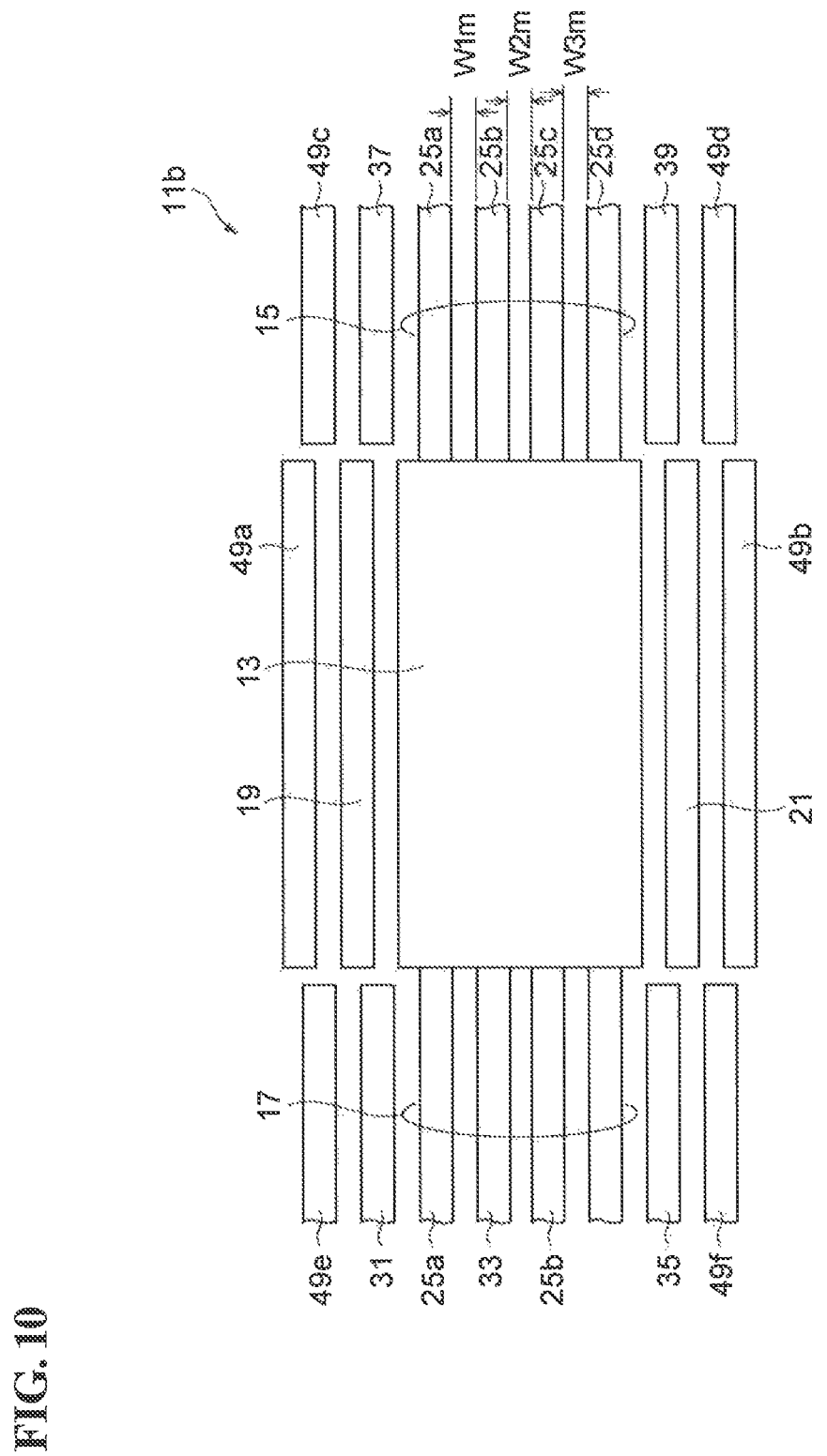
FIG. 10 is a diagram illustrating a modified example of a coherent mixer according to an embodiment.

A coherent mixer 11b illustrated in FIG. 10 further includes additional semiconductor regions 49a to 49f. The further additional semiconductor regions 49a to 49f are arranged on an external side of some of or all the additional semiconductor regions 19, 21, 31, 33, 35, 37, 39, and 41, which have been described so far. Each of the further additional semiconductor regions 49a to 49f is spaced apart from a corresponding one of the additional semiconductor regions 19, 21, 31, 35, 37, and 39 by a distance of the reference value WR. Providing the further additional semiconductor regions 49a to 49f may reduce the imbalance of the coherent mixer 11b. Similarly to as in the previous embodiment (the 2×4 MMI-type 90 degree hybrid including the additional semiconductor regions), the imbalance between I channels in the C band is reduced to 0.4 dB at maximum in the 2×4 MMI-type 90 degree hybrid in which the further additional semiconductor regions 49a to 49f are provided on an external side of the additional semiconductor regions 9, 21, 31, 33, 35, 37, 39, and 41. Note that at least one of the further additional semiconductor regions 49a to 49f is necessary. Furthermore, the further additional semiconductor regions 49a to 49f may have the same width as or a wider width than waveguides.

Figure 11:
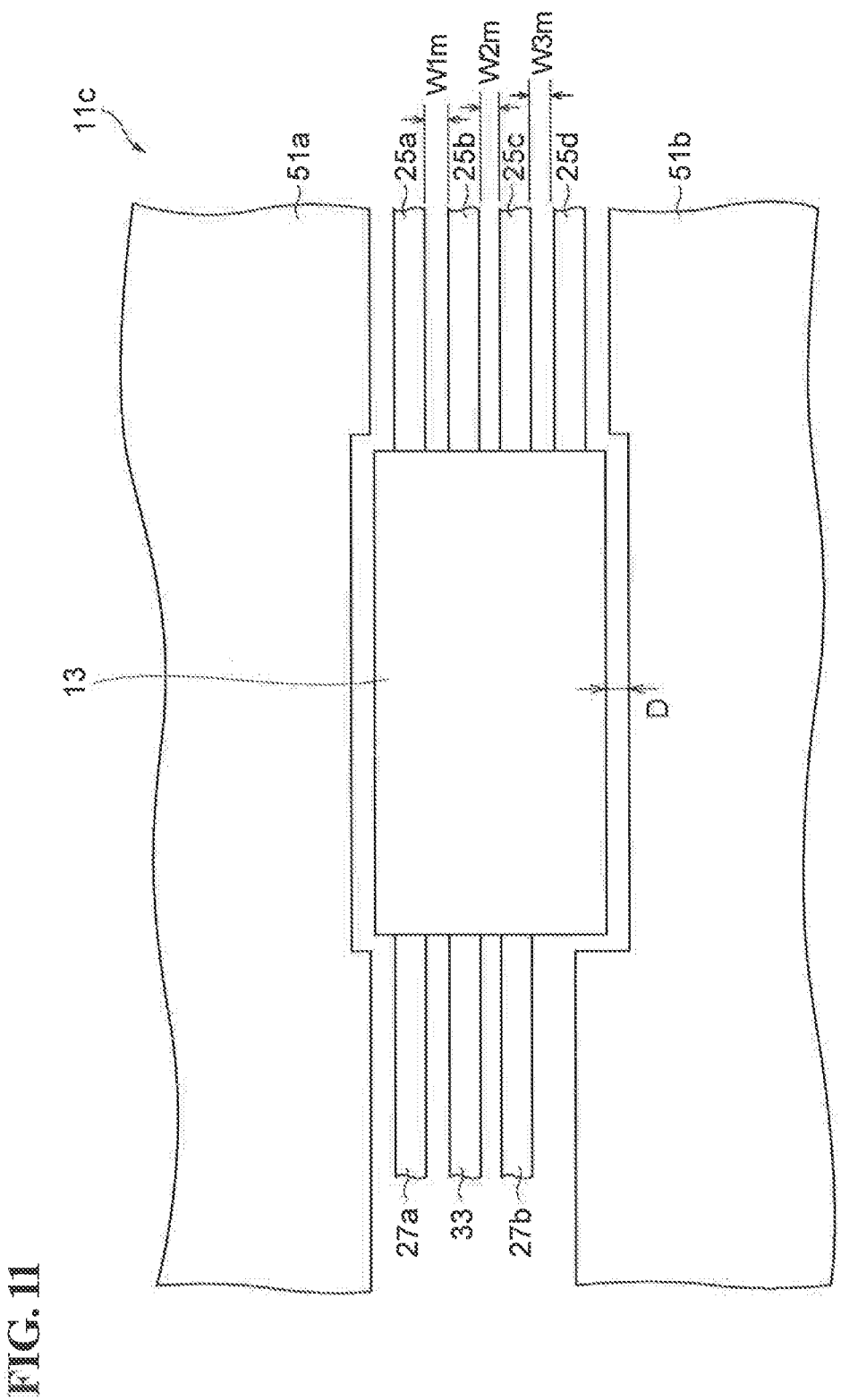
FIG. 11 is a diagram illustrating another modified example of a coherent mixer according to an embodiment.

A coherent mixer 11c illustrated in FIG. 11 further includes additional semiconductor regions (terrace semiconductor regions) 51a and 51b, each of which includes a single semiconductor region containing some of or all the additional semiconductor regions 19, 21, 31, 33, 35, 37, 39, and 41, which have been described so far. A side surface of the additional semiconductor region 51a and that of the additional semiconductor region 51b are arranged so as to be spaced apart from side surfaces of the waveguides 13, 25a, 25d, 27a, and 27b of the coherent mixer Ic by a distance smaller than or equal to the reference value WR. Providing the additional semiconductor regions 51a and 51b may reduce the imbalance of the coherent mixer 11c. Similarly to as in the previous embodiment (the 2×4 MMI-type 90 degree hybrid including the additional semiconductor regions), the imbalance between I channels in the C band is reduced to 0.4 dB at maximum in the coherent mixer 11c in which the terrace semiconductor regions 51a and 51b are provided around the 2×4 MMI coupler. A decrease in imbalance of the coherent mixer 11c may be realized. In this manner, as illustrated in FIG. 11, a terrace semiconductor region is arranged near an MMI coupler so as to keep a gap width between the terrace semiconductor region and the MMI coupler. In addition, a semiconductor region having a waveguide form is arranged between waveguides. In the embodiment, the coherent mixer 11c has characteristics similar to those of the previous embodiment.

Figure 12A:
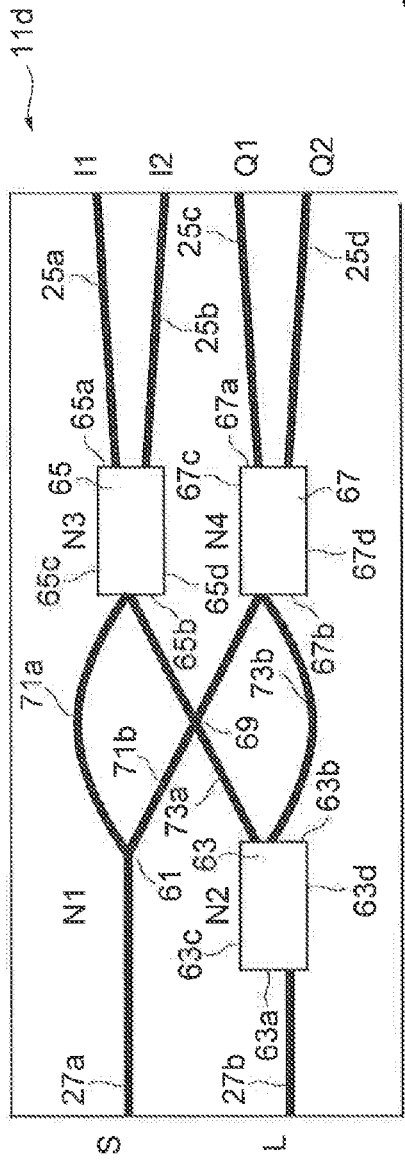
FIGS. 12A to 12D are diagrams illustrating an optical-coupler-type 90 degree hybrid.

FIGS. 12A to 12D are diagrams illustrating a coherent mixer 11d. With reference to FIG. 12A, the coherent mixer 11d includes a branching waveguide 61, a first 2×2 MMI coupler 63, a second 2×2 MMI coupler 65, a third 2×2 MMI coupler 67, and a cross waveguide 69. In the branching waveguide 61, the waveguide 27a branches into a first connecting waveguide 71a and a second connecting waveguide 71b. The first 2×2 MMI coupler 63 has a first end 63a, a second end 63b, a first side surface 63c, and a second side surface 63d. The waveguide 27b is connected to the first end 63a. A third connecting waveguide 73a and a fourth connecting waveguide 73b are connected to the second end 63b. The second 2×2 MMI coupler 65 has a first end 65b, a second end 65a, a first side surface 65c, and a second side surface 65d. The first connecting waveguide 71a and the third connecting waveguide 73a are connected to the first end 65b. The waveguide 25a and the waveguide 25b are connected to the second end 65a. The third 2×2 MMI coupler 67 has a first end 67b, a second end 67a, a first side surface 67c, and a second side surface 67d. The second connecting waveguide 71b and the fourth connecting waveguide 73b are connected to the first end 67b. A waveguide 25c and a waveguide 25d are connected to the second end 67a. In the cross waveguide 69, the second connecting waveguide 71b and the third connecting waveguide 73a are crossed with each other. At least one of the first 2×2 MMI coupler 63, the second 2×2 MMI coupler 65, and the third 2×2 MMI coupler 67 may include the following 2×2 MMI coupler. In this embodiment, the first 2×2 MMI coupler 63, the second 2×2 MMI coupler 65, and the third 2×2 MMI coupler 67 include the following 2×2 MMI coupler.

Figure 12B:
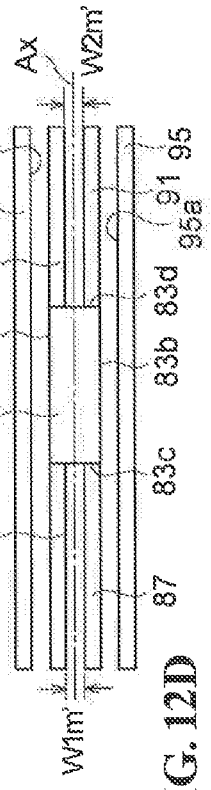

With reference to FIG. 12B, a 2×2 multi-mode MMI coupler 81 includes a multi-mode waveguide 83, a waveguide 85, a waveguide 87, a waveguide 89, a waveguide 91, a seventh semiconductor region 93, and an eighth semiconductor region 95. The multi-mode waveguide 83 has a first side surface 83a and a second side surface 83b that extend in the direction of the first axis Ax, and a first end 83c and a second end 83d that extend in a direction intersecting with the direction of the first axis Ax. The waveguide 85 has an end connected to the first end 83c. The waveguide 87 has an end connected to the first end 83c. The waveguide 89 has an end connected to the second end 83d. The waveguide 91 has an end connected to the second end 83d. The seventh semiconductor region 93 has a side surface 93a that extends substantially parallel to the first side surface 83a of the multi-mode waveguide 83. The eighth semiconductor region 95 has a side surface 95a that extends substantially parallel to the second side surface 83b of the multi-mode waveguide 83. The distance between the first side surface 83a of the multi-mode waveguide 83 and the side surface 93a of the seventh semiconductor region 93 is smaller than or equal to the reference value WR. In addition, the distance between the second side surface 83b of the multi-mode waveguide 83 and the side surface 95a of the eighth semiconductor region 95 is smaller than or equal to the reference value WR. At the first end 83c, the distance between the waveguide 85 and the waveguide 87 is a first distance value W1$m'$. In addition, at the second end 83d, the distance between the waveguide 89 and the waveguide 91 is a second distance value W2$m'$. Here, the reference value WR is a greater one of the first distance value and the second distance value. Specifically, when the first distance value is greater than the second distance value, the first distance value is used as the reference value WR. When the first distance value is smaller than the second distance value, the second distance value is used as the reference value WR. When the first distance value is equal to the second distance value, the first distance value (the second distance value) is used as the reference value WR.

In the 2×2 multi-mode MMI coupler 81, the distance between the first side surface 83a of the multi-mode waveguide 83 and the side surface 93a of the seventh semiconductor region 93 is smaller than or equal to the reference value WR. In addition, the distance between the second side surface 83b of the multi-mode waveguide 83 and the side surface 95a of the eighth semiconductor region 95 is smaller than or equal to the reference value WR. In addition, the side surface 93a of the seventh semiconductor region 93 extends substantially parallel to waveguides connected to the ends 83c and 83d of the multi-mode waveguide 83 and is spaced apart from the waveguides by a distance smaller than or equal to the reference value WR. The side surface 95a of the eighth semiconductor region 95 extends substantially parallel to waveguides connected to the ends 83c and 83d of the multi-mode waveguide 83 and is spaced apart from the waveguides by a distance smaller than or equal to the reference value WR. Thus, the difference between the heights of the first side surface 83a and the second side surface 83b of the multi-mode waveguide 83 and the heights of the waveguide 85, the waveguide 87, the waveguide 89, and the waveguide 91 may be reduced. Providing the seventh semiconductor region 93 and the eighth semiconductor region 95 that extend substantially parallel to the first side surface 83a and the second side surface 83b of the multi-mode waveguide 83, respectively, may reduce effect of this difference in height on interference occurring in the multi-mode waveguide 83.

In the coherent mixer 11d that uses the 2×2 multi-mode MMI coupler 81, the difference between the heights of the first side surface 83a and the second side surface 83b of the multi-mode waveguide 83 and the heights of the waveguide 85, the waveguide 87, the waveguide 89, and the waveguide 91 may be reduced in each of the first 2×2 MMI coupler 63, the second 2×2 MMI coupler 65, and the third 2×2 MMI coupler 67. As a result, the imbalance of the coherent mixer 11d may be reduced.

Figure 12C:
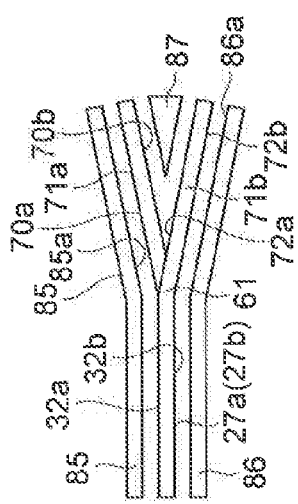

With reference to FIG. 12C, in the branching waveguide 61 in the coherent mixer 11d, a first side surface 32a of the waveguide 27a is connected to a first side surface 70a of the first connecting waveguide 71a. A second side surface 32b of the waveguide 27a is connected to a second side surface 72b of the second connecting waveguide 71b. A second side surface 70b of the first connecting waveguide 71a is connected to a first side surface 72a of the second connecting waveguide 71b. The coherent mixer 11c includes a tenth semiconductor region 85. A side surface 85a of the tenth semiconductor region 85 extends substantially parallel to and is spaced apart from the first side surface 32a of the waveguide 27a by a distance smaller than or equal to the reference value WR. In addition, the side surface 85a of the tenth semiconductor region 85 extends substantially parallel to and is spaced apart from the first side surface 70a of the first connecting waveguide 71a by a distance smaller than or equal to the reference value WR, from the branching waveguide 61 to the second 2×2 MMI coupler 65. The coherent mixer 11d includes an eleventh semiconductor region 86. A side surface 86a of the eleventh semiconductor region 86 extends substantially parallel to and is spaced apart from the second side surface 32b of the waveguide 27a by a distance smaller than or equal to the reference value WR. In addition, the side surface 86a of the eleventh semiconductor region 86 extends substantially parallel to and is spaced apart from the second side surface 72b of the second connecting waveguide 71b by a distance smaller than or equal to the reference value WR, from the branching waveguide 61 to the third 2×2 MMI coupler 67. Furthermore, the coherent mixer 11d includes a twelfth semiconductor region 87. A side surface 87a of the twelfth semiconductor region 87 extends substantially parallel to and is spaced apart from the second side surface 70b of the first connecting waveguide 71a by a distance smaller than or equal to the reference value WR, from the branching waveguide 61 to the second 2×2 MMI coupler 65. In addition, the side surface 87a of the twelfth semiconductor region 87 extends substantially parallel to and is spaced apart from the first side surface 72a of the second connecting waveguide 71b by a distance smaller than or equal to the reference value WR, from the branching waveguide 61 to the third 2×2 MMI coupler 67.

Figure 12D:
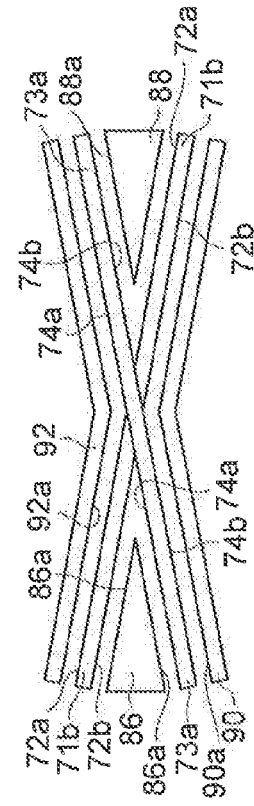

With reference to FIG. 12D, the coherent mixer 11d includes a thirteenth semiconductor region 88. A side surface 88a of the thirteenth semiconductor region 88 extends substantially parallel to and is spaced apart from the first side surface 72a of the second connecting waveguide 71b and a second side surface 74b of the third connecting waveguide 73a by a distance smaller than or equal to the reference value WR, from the second 2×2 MMI coupler 65 to the third 2×2 MMI coupler 67.

The coherent mixer 11d includes a fourteenth semiconductor region 90. A side surface 90a of the fourteenth semiconductor region 90 extends substantially parallel to and is spaced apart from the second side surface 72b of the second connecting waveguide 71b and the second side surface 74b of the third connecting waveguide 73a by a distance smaller than or equal to the reference value WR, from the first 2×2 MMI coupler 63 to the third 2×2 MMI coupler 67.

The coherent mixer 11d includes a fifteenth semiconductor region 92. A side surface 92a of the fifteenth semiconductor region 92 extends substantially parallel to and is spaced apart from the other side surface 72a (the side opposite the side surface) of the second connecting waveguide 71b and the other side surface 74a (the side opposite the side surface) of the third connecting waveguide 73a by a distance smaller than or equal to the reference value WR, from the branching waveguide 61 to the second 2×2 MMI coupler 65.

An optical-coupler-type 90 degree hybrid illustrated in FIGS. 12A to 12D is formed. In the optical-coupler-type 90 degree hybrid, an MMI coupler and waveguides near the MMI coupler have the same form. In addition, four connecting waveguides that connect an upstream optical coupler to a downstream optical coupler have the same length and form. In other words, the four connecting waveguides have the same equivalent refractive index. Two of the four connecting waveguides are crossed with each other. When the form of a crossing portion changes, a change in phase occurs. The imbalance of an optical-coupler-type 90 degree hybrid that includes the above-described additional semiconductor regions is 0.4 dB at maximum. In contrast, the imbalance of an optical-coupler-type 90 degree hybrid that does not include the above-described additional semiconductor regions is 1.0 dB at maximum. Additional semiconductor regions or additional semiconductor regions having a form of a waveguide improve the uniformity of the widths and forms of waveguides. As a result, the equivalent refractive indices of all the four connecting waveguides may be made to be almost the same.

Figure 13:
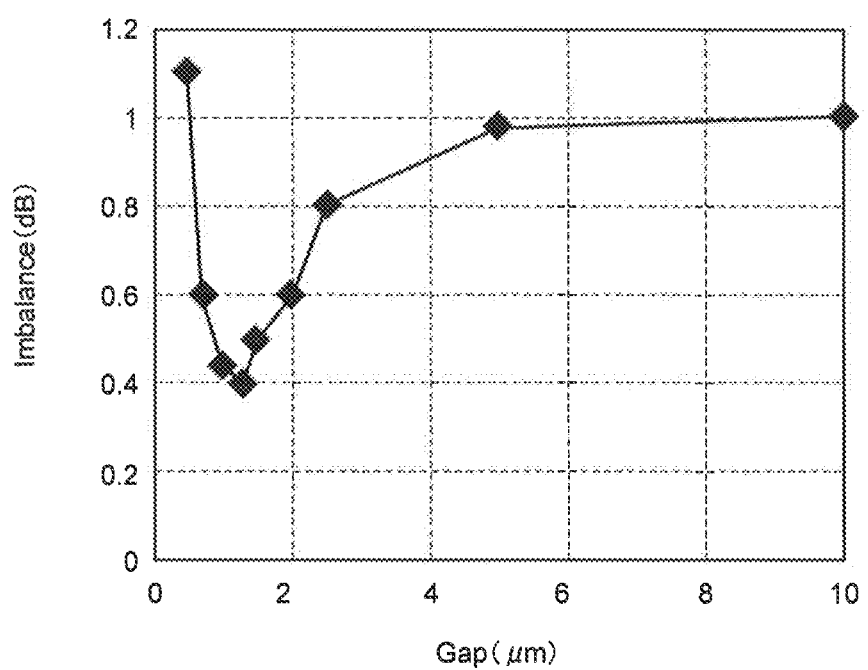
FIG. 13 is a diagram illustrating a change in imbalance versus a gap between an additional semiconductor region having a waveguide form and an original waveguide.
Figures 14A, 14B:
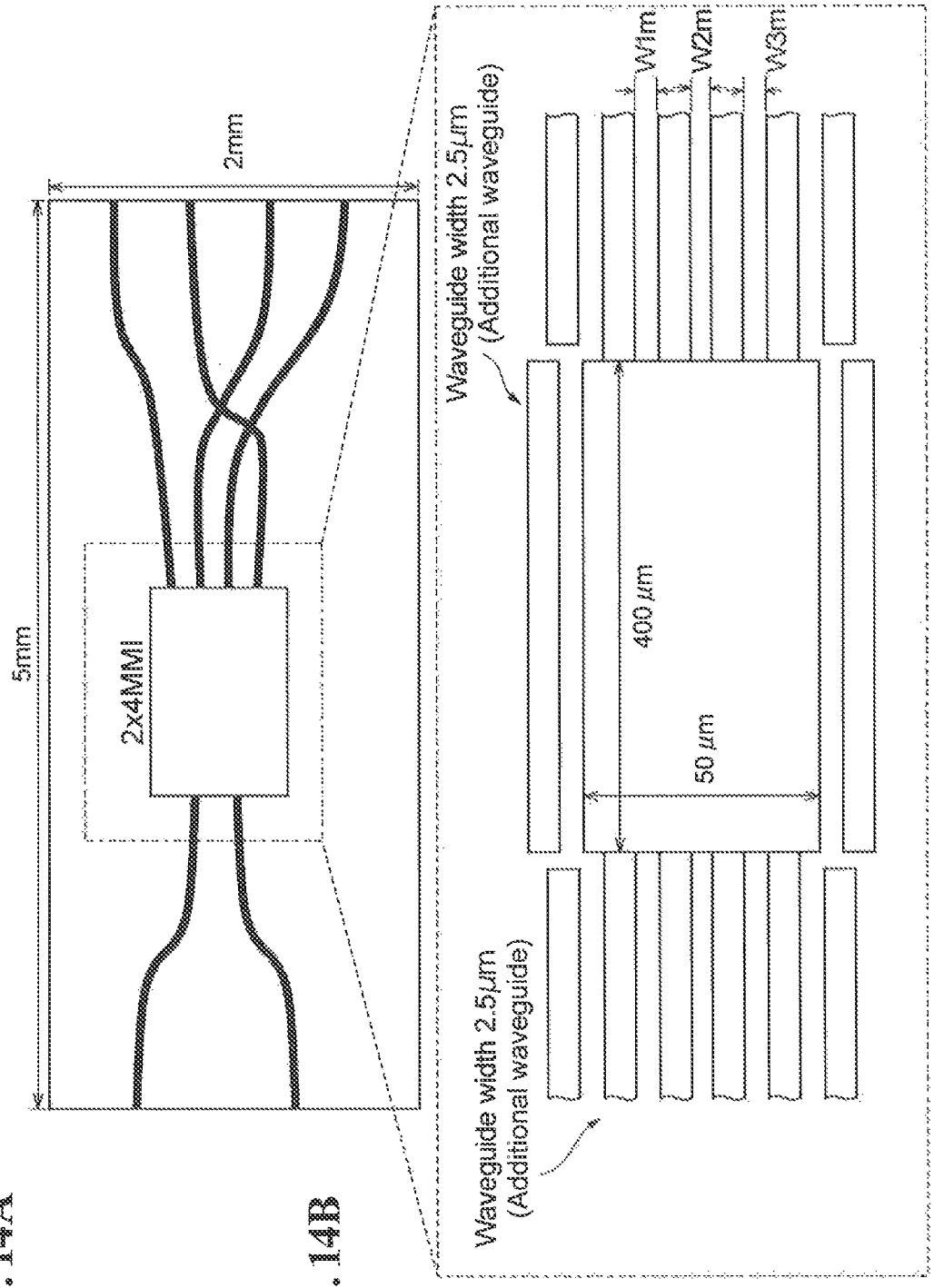
FIGS. 14A and 14B illustrate an MMI coupler for which characteristics illustrated in FIG. 13 have been measured.

FIG. 13 is a diagram illustrating a relationship between a gap between an additional semiconductor region (a dummy waveguide) and an original waveguide and an imbalance. This characteristic is measured using an MMI coupler illustrated in FIG. 14. With reference to FIG. 13, the wider the gap, the greater the imbalance. When the size of the gap becomes almost the width of the original waveguide, the imbalance becomes saturated. Accordingly, the wider the gap, the smaller the effect of an additional semiconductor region (an additional dummy waveguide). The characteristics of the MMI coupler having the wider gap approach those of the MMI coupler in which additional semiconductor regions are not provided. On the basis of this result, it is desirable that the gap between an additional semiconductor region and a waveguide of an MMI coupler be smaller than or equal to the width of an actual waveguide. On the other hand, even when the gap is narrower than a gap between actual waveguides, an imbalance tends to be greater. Since a gap provided on the left of a waveguide of an MMI coupler differs from a gap provided on the right of the waveguide, the difference in height between left and right side surfaces of the waveguide occurs. This difference in height causes the form of the waveguide to be asymmetric. In addition, the lower limit of a gap is determined on the basis of the performance of photolithography. In this experiment, when a gap is as narrow as about 0.5 μm, a mesa may not be formed. According to this experiment, it is preferable that a gap be, for example, smaller than or equal to 6 μm and greater than or equal to 0.5 μm. Furthermore, it is preferable that the width of a waveguide be, for example, smaller than or equal to 6 μm and greater than or equal to 0.5 μm.

According to the embodiments, a phase shift and an imbalance shift may be reduced, the phase shift and the imbalance shift being a shift from a desired value in design and caused by external perturbations during manufacturing. An MMI coupler according to the embodiments is applied not only to a coherent mixer but also to other uses. In addition, evaluation of a phase shift and an imbalance shift using a coherent mixer is practical for evaluation of an MMI coupler.

The present invention is not limited to specific structures disclosed in the embodiments.

What is claimed is:
1. A coherent mixer comprising:
optical inputs;
optical outputs;
a multi-mode interference coupler connecting the optical inputs to the optical outputs, the coupler including:
a first multi-mode waveguide that has a first side surface, a second side surface, a first end, and a second end, the first side surface and the second side surface extending in a direction of a first axis, the first end and the second end extending in a direction intersecting with the first axis;

a first waveguide group including a plurality of semiconductor regions connected to the first end of the first multi-mode waveguide, the plurality of semiconductor regions of the first waveguide group optically coupling the optical outputs to the first multi-mode waveguide;

a second waveguide group including a plurality of semiconductor regions connected to the second end of the first multi-mode waveguide, the plurality of semiconductor regions of the second waveguide group optically coupling the optical inputs to the second end of the first multi-mode waveguide a first semiconductor region that has a side surface extending substantially parallel to the first side surface of the first multi-mode waveguide; and a first external semiconductor region that is provided on an external side of the first waveguide group, the first external semiconductor region having a side surface extending substantially parallel to an edge of the first waveguide group, wherein adjacent semiconductor regions of the first waveguide group have distances therebetween, at least one of the distances having a maximum value, the side surface of the first semiconductor region is spaced apart from the first side surface of the first multi-mode waveguide by a distance smaller than or equal to a reference value equal to said maximum value of the distances, and the side surface of the first external semiconductor region is spaced apart from the edge of the first waveguide group by a distance smaller than or equal to the reference value.

2. The coherent mixer according to claim 1, further comprising:

a second semiconductor region that has a side surface extending substantially parallel to the second side surface of the first multi-mode waveguide;

a second external semiconductor region that is provided on the other external side of the first waveguide group, the second external semiconductor region having a side surface extending substantially parallel to the other edge of the first waveguide group, wherein the side surface of the second external semiconductor region is spaced apart from the other edge of the first waveguide group by a distance smaller than or equal to the reference value, and the side surface of the second semiconductor region is spaced apart from the second side surface of the first multi-mode waveguide by a distance smaller than or equal to the reference value.

3. The coherent mixer according to claim 2, wherein the first waveguide group includes a first waveguide, a second waveguide, a third waveguide, and a fourth waveguide that are arranged at the first end in a direction intersecting with the first axis, the second waveguide group includes a fifth waveguide and a sixth waveguide that are each connected to the second end of the first multi-mode waveguide, and each of the fifth and sixth waveguides has a first side surface and a second side surface, wherein the coherent mixer further comprises:

a third semiconductor region provided on an external side of the second waveguide group, the third semiconductor region having a side surface extending substantially parallel to the first side surface of the fifth waveguide; and a fourth semiconductor region provided on the other external side of the second waveguide group, the fourth semiconductor region having a side surface extending substantially parallel to the second side surface of the sixth waveguide, and wherein the side surface of the third semiconductor region is spaced apart from the first side surface of the fifth waveguide by a distance smaller than or equal to the reference value, and the side surface of the fourth semiconductor region is spaced apart from the second side surface of the sixth waveguide by a distance smaller than or equal to the reference value.

4. The coherent mixer according to claim 3, wherein the third semiconductor region has an end connected to the second end of the first multi-mode waveguide.

5. The coherent mixer according to claim 3, further comprising:

a fifth semiconductor region provided between the fifth and sixth waveguides, the fifth semiconductor region having a first side surface extending substantially parallel to the second side surface of the fifth waveguide and a second side surface extending substantially parallel to the first side surface of the sixth waveguide, wherein the first side surface of the fifth semiconductor region is spaced apart from the second side surface of the fifth waveguide by a distance smaller than or equal to the reference value, and the second side surface of the fifth semiconductor region is spaced apart from the first side surface of the sixth waveguide by a distance smaller than or equal to the reference value.

6. The coherent mixer according to claim 5, wherein each of the fourth and fifth semiconductor regions has an end connected to the second end of the first multi-mode waveguide.

7. The coherent mixer according to claim 3, further comprising:

a sixth semiconductor region that is provided between the second waveguide and the third waveguide, the sixth semiconductor region having a first side surface and a second side surface, wherein the first side surface of the sixth semiconductor region extends substantially parallel to the side surface of the second waveguide, the second side surface of the sixth semiconductor region extends substantially parallel to the side surface of the third waveguide, the first side surface of the sixth semiconductor region is spaced apart from the side surface of the second waveguide by a distance smaller than or equal to the reference value, and the second side surface of the sixth semiconductor region is spaced apart from the side surface of the third waveguide by a distance smaller than or equal to the reference value.

8. The coherent mixer according to claim 7, further comprising:

a second multi-mode waveguide connected to an end of the first waveguide and an end of the second waveguide, wherein the second multi-mode waveguide has a first side surface extending substantially parallel to the first side surface of the sixth semiconductor region, and the first side surface of the sixth semiconductor region is spaced apart from the first side surface of the second multi-mode waveguide by a distance smaller than or equal to the reference value.

9. The coherent mixer according to claim 1, wherein the first semiconductor region has a waveguide structure that is substantially the same as the structure of the first multi-mode semiconductor waveguide.

10. The coherent mixer according to claim 1, wherein the inputs include waveguides and the outputs include waveguides.

11. The coherent mixer according to claim 10, wherein
the input waveguides include a first input waveguide and a second input waveguide, and
the output waveguides include a first output waveguide, a second output waveguide, a third output waveguide, and a fourth output waveguide.

12. A coherent mixer comprising:
optical inputs;
optical outputs;
a multi-mode interference coupler connecting the optical inputs to the optical outputs, the coupler including:
a first multi-mode waveguide that has a first side surface, a second side surface, a first end, and a second end, the first side surface and the second side surface extending in a direction of a first axis, the first end and the second end extending in a direction intersecting with the first axis;
a first waveguide group including a plurality of semiconductor regions connected to the first end of the first multi-mode waveguide, the plurality of semiconductor regions of the first waveguide group optically coupling the optical outputs to the first multi-mode waveguide;
a second waveguide group including a plurality of semiconductor regions connected to the second end of the first multi-mode waveguide, the plurality of semiconductor regions of the second waveguide group optically coupling the optical inputs to the second end of the first multi-mode waveguide
a first semiconductor region that has a side surface extending substantially parallel to the first side surface of the first multi-mode waveguide; and
a first external semiconductor region that is provided on an external side of the first waveguide group, the first external semiconductor region having a side surface extending substantially parallel to an edge of the first waveguide group, wherein
adjacent semiconductor regions of the first waveguide group have distances therebetween, at least one of the distances having a maximum value or a minimum value,
the side surface of the first semiconductor region is spaced apart from the first side surface of the first multi-mode waveguide by a distance smaller than or equal to a reference value equal to either said maximum value or said minimum value of the distances, and
the side surface of the first external semiconductor region is spaced apart from the edge of the first waveguide group by a distance smaller than or equal to the reference value.

13. The coherent mixer according to claim 12, further comprising:
a second semiconductor region that has a side surface extending substantially parallel to the second side surface of the first multi-mode waveguide;
a second external semiconductor region that is provided on the other external side of the first waveguide group, the second external semiconductor region having a side surface extending substantially parallel to the other edge of the first waveguide group,
wherein the side surface of the second external semiconductor region is spaced apart from the other edge of the first waveguide group by a distance smaller than or equal to the reference value, and
the side surface of the second semiconductor region is spaced apart from the second side surface of the first multi-mode waveguide by a distance smaller than or equal to the reference value.

14. The coherent mixer according to claim 13, wherein
the first waveguide group includes a first waveguide, a second waveguide, a third waveguide, and a fourth waveguide that are arranged at the first end in a direction intersecting with the first axis,
the second waveguide group includes a fifth waveguide and a sixth waveguide that are each connected to the second end of the first multi-mode waveguide, and
each of the fifth and sixth waveguides has a first side surface and a second side surface,
wherein the coherent mixer further comprises:
a third semiconductor region provided on an external side of the second waveguide group, the third semiconductor region having a side surface extending substantially parallel to the first side surface of the fifth waveguide, and an end connected to the second end of the first multi-mode waveguide; and
a fourth semiconductor region provided on the other external side of the second waveguide group, the fourth semiconductor region having a side surface extending substantially parallel to the second side surface of the sixth waveguide, and wherein
the side surface of the third semiconductor region is spaced apart from the first side surface of the fifth waveguide by a distance smaller than or equal to the reference value, and
the side surface of the fourth semiconductor region is spaced apart from the second side surface of the sixth waveguide by a distance smaller than or equal to the reference value.

15. The coherent mixer according to claim 14, further comprising:
a fifth semiconductor region provided between the fifth and sixth waveguides, the fifth semiconductor region having a first side surface extending substantially parallel to the second side surface of the fifth waveguide and a second side surface extending substantially parallel to the first side surface of the sixth waveguide, wherein
the first side surface of the fifth semiconductor region is spaced apart from the second side surface of the fifth waveguide by a distance smaller than or equal to the reference value,
the second side surface of the fifth semiconductor region is spaced apart from the first side surface of the sixth waveguide by a distance smaller than or equal to the reference value, and
each of the fourth and fifth semiconductor regions has an end connected to the second end of the first multi-mode waveguide.

16. The coherent mixer according to claim 14, further comprising:
a sixth semiconductor region that is provided between the second waveguide and the third waveguide, the sixth semiconductor region having a first side surface and a second side surface, wherein
the first side surface of the sixth semiconductor region extends substantially parallel to the side surface of the second waveguide,
the second side surface of the sixth semiconductor region extends substantially parallel to the side surface of the third waveguide, the first side surface of the sixth semiconductor region is spaced apart from the side surface of the second waveguide by a distance smaller than or equal to the reference value, and the second side surface of the sixth semiconductor region is spaced apart from the side surface of the third waveguide by a distance smaller than or equal to the reference value.

17. The coherent mixer according to claim 16, further comprising:

a second multi-mode waveguide connected to an end of the first waveguide and an end of the second waveguide, wherein the second multi-mode waveguide has a first side surface extending substantially parallel to the first side surface of the sixth semiconductor region, and the first side surface of the sixth semiconductor region is spaced apart from the first side surface of the second multi-mode waveguide by a distance smaller than or equal to the reference value.

18. The coherent mixer according to claim 12, wherein the first semiconductor region has a waveguide structure that is substantially the same as the structure of the first multi-mode semiconductor waveguide.

19. The coherent mixer according to claim 12, wherein the inputs include waveguides and the outputs include waveguides, the input waveguides include a first input waveguide and a second input waveguide, and the output waveguides include a first output waveguide, a second output waveguide, a third output waveguide, and a fourth output waveguide.

* * * * *